(12) United States Patent
Sana

(10) Patent No.: US 11,235,494 B2
(45) Date of Patent: Feb. 1, 2022

(54) METHOD OF MANUFACTURING COMPOSITE MATERIAL STRUCTURE

(71) Applicant: KAWASAKI JUKOGYO KABUSHIKI KAISHA, Kobe (JP)

(72) Inventor: Toshikazu Sana, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 304 days.

(21) Appl. No.: 16/466,274

(22) PCT Filed: Nov. 30, 2017

(86) PCT No.: PCT/JP2017/043111
§ 371 (c)(1),
(2) Date: Jun. 3, 2019

(87) PCT Pub. No.: WO2018/101422
PCT Pub. Date: Jun. 7, 2018

(65) Prior Publication Data
US 2020/0078990 A1  Mar. 12, 2020

(30) Foreign Application Priority Data
Dec. 1, 2016 (JP) .............................. JP2016-233886

(51) Int. Cl.
*B29C 33/30* (2006.01)
*B29C 41/38* (2006.01)
(Continued)

(52) U.S. Cl.
CPC ............ *B29C 33/302* (2013.01); *B29C 41/38* (2013.01); *B29C 43/12* (2013.01);
(Continued)

(58) Field of Classification Search
None
See application file for complete search history.

(56) References Cited

U.S. PATENT DOCUMENTS

2010/0032862 A1   2/2010   Micheaux et al.
2011/0062613 A1*  3/2011   Haraguchi .............. B29C 44/58
                                                      264/41
(Continued)

FOREIGN PATENT DOCUMENTS

JP    H07-096539 A    4/1995
JP    2010-507504 A   3/2010
(Continued)

*Primary Examiner* — Timothy Kennedy
*Assistant Examiner* — Olukorede Esan
(74) *Attorney, Agent, or Firm* — Oliff PLC

(57) ABSTRACT

A seal member formed in a line shape having ends is inserted in a seal groove formed on at least one of adjacent side surfaces of segments. A lip portion is provided on a seal upper portion of the member so at least a tip end thereof projects to an outside of the seal groove when the member is inserted in the groove. The seal member is hollow or includes a concave portion on at least a seal bottom portion thereof. When assembling the segments as a single structure, the adjacent side surfaces of the segments are coupled to each other, and the seal member is crushed in a cross sectional direction by the side surface of the other segment to seal between the segments. With this, complication of manufacturing steps can be suppressed or avoided while realizing a satisfactory sealed state between the adjacent segments of a mold.

9 Claims, 12 Drawing Sheets

(51) Int. Cl.
  *B29C 43/12* (2006.01)
  *B29C 43/36* (2006.01)
  *B29C 45/17* (2006.01)
  *B29K 101/10* (2006.01)
  *B29L 31/30* (2006.01)

(52) U.S. Cl.
  CPC .......... *B29C 2043/3652* (2013.01); *B29C 2045/1741* (2013.01); *B29K 2101/10* (2013.01); *B29L 2031/3076* (2013.01)

(56) References Cited

U.S. PATENT DOCUMENTS

2014/0008009 A1* 1/2014 Sana ............... B29C 70/543
  156/213
2016/0167316 A1* 6/2016 Pillon ............... B29C 33/0038
  428/34.1

FOREIGN PATENT DOCUMENTS

WO   2009/145102 A1   12/2009
WO   2012/090468 A1   7/2012

* cited by examiner

METHOD OF MANUFACTURING COMPOSITE MATERIAL STRUCTURE

TECHNICAL FIELD

The present invention relates to a method of manufacturing a hollow composite material structure. The present invention particularly relates to a method of preferably manufacturing a composite material structure for use as, for example, a fuselage of an aircraft by using a mold constituted by a plurality of segments, the mold being kept as a single structure by coupling adjacent side surfaces of the segments to each other.

BACKGROUND ART

In recent years, fiber-reinforced resin composite materials (hereinafter suitably abbreviated as "composite materials") are widely used in the fields in which metal materials have been conventionally used. Among the composite materials, carbon fiber reinforced materials formed by impregnating carbon fibers as reinforced fibers with matrix resin such as epoxy resin are lighter and stronger than the metal materials. Therefore, the carbon fiber reinforced materials are widely adopted in the fields of sports goods, industrial machines, aerospace, and the like.

In the field of aerospace among these fields, for example, stiffened panels formed by integrating skins and stiffeners made of the composite material are adopted in structures, such as wings and fuselages of aircrafts. One of typical stiffeners is a stringer. Examples of the method of integrating the stiffeners made of the composite material and the skins made of the composite material include a co-curing method and a co-bonding method. According to the co-curing method, a plurality of prepregs which become the stiffeners are laminated, and a plurality of prepregs which become the skins are laminated. Then, these prepregs are cured by an autoclave to be integrally molded. According to the co-bonding method, after the stiffeners are first cured by the autoclave, a plurality of prepregs which become the skins are laminated and cured by the autoclave to be integrally molded.

One example of the technology for manufacturing such structures of the aircrafts is a composite tool for molding a cylinder-shaped portion as disclosed in PTL 1. In order to manufacture the cylinder-shaped portion made of the composite material, the composite tool is configured by: arranging a plurality of (seven, for example) members or tiles in a cylindrical manner; and coupling the members or tiles to one another. Seal units (seal members) are arranged at respective coupled portions each between the members (tiles).

A specific example of the seal unit is an O-ring gasket that is expandable. Grooves in which the O-ring gaskets are provided are located on respective side surfaces of the adjacent members (tiles) so as to be displaced from each other (so as to be alternately arranged), and the O-ring gaskets are arranged in these grooves. The O-ring gasket has a hollow structure (tubular structure) in a section thereof and is expandable by a pressure difference generated during autoclaving.

The O-ring gasket seals between the adjacent members in a longitudinal direction. Therefore, in PTL 1, in order to realize sealing at end portions of the adjacent members, a leak prevention insertion portion is provided at the end portions. The insertion portion includes two holes facing the groove at which the O-ring gasket is arranged. A part of the O-ring gasket is exposed to an outside through between the adjacent members. The exposed O-ring gasket is connected to a high-pressure air source. With this, the O-ring gasket can be expanded by pressurizing an inside of the O-ring gasket.

According to PTL 1, in order not to weaken the structures of the members (tiles), the grooves are formed on the adjacent side surfaces of the members so as to be provided alternately (so as to be displaced from each other). Further, since the O-ring gaskets are provided at the grooves arranged as above, the O-ring gaskets are also provided so as to be displaced from each other. Therefore, by the pressurization of the inside of the O-ring gasket by the high-pressure air source in addition to the pressure difference generated by the autoclave, the O-ring gasket arranged at one of the adjacent side surfaces of the members expands to contact the other side surface, and the O-ring gasket arranged at the other side surface expands to contact the one side surface. With this, double seal is realized between the adjacent members.

CITATION LIST

Patent Literature

PTL 1: Published Japanese Translation of PCT Application No. 2010-507504

SUMMARY OF INVENTION

Technical Problem

However, according to the configuration disclosed in PTL 1, in order to realize a stable sealed state, various conditions need to be appropriately adjusted as below. Therefore, the method of manufacturing the cylinder-shaped portion may become complex.

For example, the O-ring gasket disclosed in PTL 1 is a seal unit (seal member) that is intended to expand. Therefore, in order to realize a satisfactory and stable sealed state, conditions of the autoclave need to be set to generate a preferred pressure difference, and shop air of adequate pressure needs to be continuously supplied from an outside during the autoclaving.

Further, heat expansion of the O-ring gasket during the autoclaving needs to be considered. For example, in order to realize a predetermined expansion coefficient in a cross sectional direction of the tubular structure, a thermal expansion coefficient in the cross sectional direction needs to be considered in addition to the pressure difference of the autoclave and the pressure of the shop air. Further, as described above, since the O-ring gasket is partially exposed from both end portions of the coupled portion, the amount of exposure is predicted to increase by heat expansion in a line direction. Therefore, the O-ring gasket needs to be fixed at the leak prevention insertion portion such that the increase in the amount of exposure due to the heat expansion is prevented while keeping the hollow state of the tubular structure.

Instead of the seal member configured to expand by the pressure difference as disclosed in PTL 1, a seal member configured to be compressed (crushed) in the cross sectional direction by a load may be used. However, according to the seal member configured to be compressed, as a seal length of the segment (the member or the tile in PTL 1) constituting the mold (the composite tool in PTL 1) increases, the load for compressing the seal member increases. The load may further increase depending on the hardness and shape of the seal member.

Therefore, when one segment is moved to be combined with the other segment, the segment needs to be moved by a large load for compressing the seal member. In order to manufacture high-quality composite material structures, it is preferable that a level difference be little between outer peripheral surfaces of the adjacent segments. However, as the load during the movement of the segment increases, the degree of difficulty of position adjustment of the segments increases. Therefore, assembly work of the mold becomes complex.

The present invention was made to solve the above problems, and an object of the present invention is to, in a method of manufacturing a composite material structure by using a mold constituted by a plurality of segments, suppress or avoid complication of manufacturing steps while realizing a satisfactory sealed state between the adjacent segments of the mold.

Solution to Problem

To solve the above problems, a method of manufacturing a composite material structure according to the present invention is a method of manufacturing a hollow composite material structure including a skin constituted by at least a thermosetting resin composition and a fiber material, the method using a mold located in the hollow composite material structure, the mold being constituted by a plurality of segments and kept as a single structure by coupling adjacent side surfaces of the segments to each other. The method includes: laminating a prepreg on an outer peripheral surface of the mold, the prepreg being configured to become the skin by thermal curing; forming a vacuum bag after the prepreg is laminated, the vacuum bag being configured to seal an outside of the mold; and inserting seal members in seal grooves each provided on at least one of the adjacent side surfaces of the segments, each of the seal members being formed in a line shape having ends. A part of the seal member which part contacts a bottom surface of the seal groove when the seal member is inserted in the seal groove is referred to as a seal bottom portion. A part of the seal member which part is opposed to the seal bottom portion is referred to as a seal upper portion. A lip portion is provided at the seal upper portion such that at least a tip end of the lip portion projects to an outside of the seal groove when the seal member is inserted in the seal groove. The seal member is hollow therein or includes a concave portion on at least the seal bottom portion of the seal member. When assembling the segments as the single structure, the adjacent side surfaces of the segments are coupled to each other, and the seal member provided at one of the segments is crushed in a cross sectional direction by the side surface of the other segment to seal between the segments. The method further includes, while subjecting an inside of the vacuum bag to vacuum suction, subjecting the prepreg to the thermal curing while being pressurized by autoclaving of the entire mold.

According to the above configuration, the seal structure including the seal member configured as above is provided between the adjacent segments. The seal member includes the lip portion and the hollow or concave portion and is formed in a line configuration having ends. Therefore, regarding the cross sectional direction of the seal member, the sealed state can be formed by compressing the seal member without applying a high load. Regarding the longitudinal direction of the seal member, the expansion (linear expansion) in the longitudinal direction generated by the heating during the autoclaving can be easily adjusted by both end portions of the seal member.

With this, the more satisfactory and stable sealed state can be realized between the adjacent segments. Therefore, when the vacuum bag is formed on the outer peripheral surface of the mold, the inside of the vacuum bag can be satisfactorily subjected to vacuum suction. Therefore, during the autoclaving, the prepreg located outside the mold and inside the vacuum bag can be satisfactorily pressurized.

In addition, since the increase in the moving load of the segment can be suppressed or avoided, the level difference between the adjacent segments can be satisfactorily adjusted when assembling the mold. With this, the accuracy of the outer peripheral surface of the mold improves, so that the high quality skin can be formed. As a result, the complication of the manufacturing steps can be suppressed or avoided while realizing the satisfactory sealed state between the adjacent segments of the mold.

Advantageous Effects of Invention

According to the above configuration, the present invention has an effect of being able to, in a method of manufacturing a composite material structure by using a mold constituted by a plurality of segments, suppress or avoid complication of manufacturing steps while realizing a satisfactory sealed state between the adjacent segments of the mold.

DESCRIPTION OF EMBODIMENTS

Hereinafter, a representative embodiment of the present invention will be explained with reference to the drawings. In the following explanations and the drawings, the same reference signs are used for the same or corresponding components, and a repetition of the same explanation is avoided.

Mold for Manufacturing Composite Material Structure

First, a mold used in a method of manufacturing a composite material structure according to the present embodiment will be explained with reference to FIGS. 1A to 4.

Figure 1A:
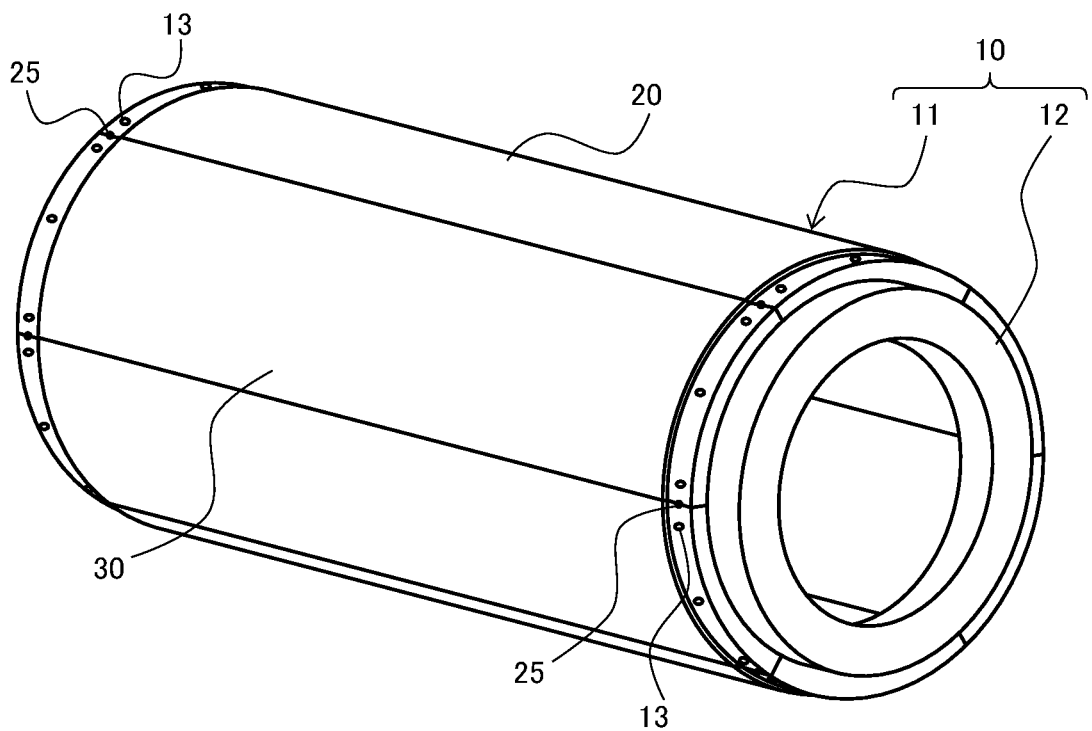
FIG. 1A is a schematic perspective view showing one example of the configuration of a mold used in a method of manufacturing a composite material structure according to the present embodiment.
Figure 1B:
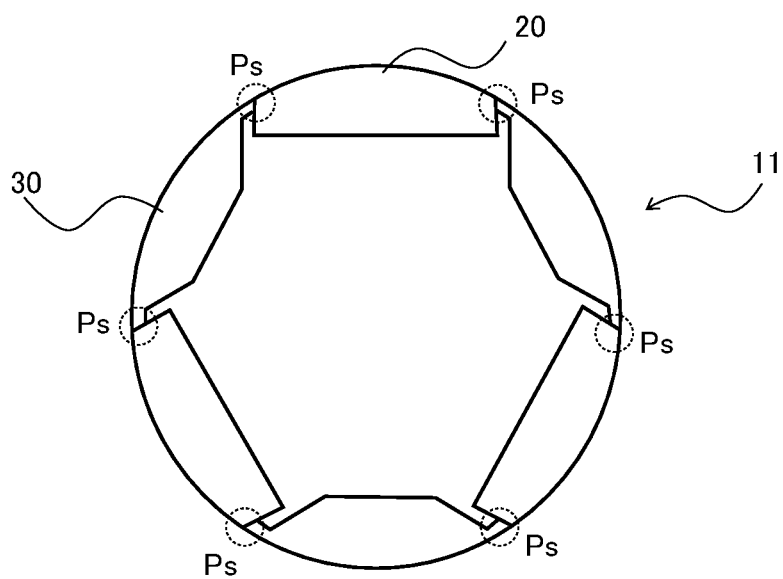
FIG. 1B is a schematic end surface view showing one example of the configuration of a mandrel included in the mold shown in FIG. 1A.

As shown in FIG. 1A, a mold 10 according to the present embodiment includes at least a mandrel 11 and a pair of support rings 12. The mandrel 11 is a single cylindrical structure (cylindrical member), and the support rings 12 are located at both ends of the mandrel 11. The mandrel 11 is formed by coupling side surfaces of six segments, i.e., three first segments 20 and three second segments 30 to one another. As schematically shown in FIG. 1B, in the mandrel 11, the first segments 20 and the second segments 30 are alternately coupled to one another. Both ends of the mandrel 11 are supported by the respective support rings 12. Thus, the six segments 20 and 30 are kept in a cylindrical shape.

As shown in FIG. 1A, a plurality of vacuum suction holes 13 are provided on surfaces of both end portions of the segments 20 and 30. Each of end portions of a seal groove 25 is exposed between a peripheral edge surface of an end portion of the segment 20 and a peripheral edge surface of an end portion of the adjacent segment 30. A below-described seal member is inserted into the seal groove 25. In FIG. 1B, parts Ps surrounded by dotted lines are positions at which seal structures of the mold 10 are provided. The parts Ps correspond to positions at each of which the side surface of the first segment 20 and the side surface of the second segment 30 are coupled to each other. The seal structure according to the present embodiment includes the seal groove 25 shown in FIG. 1A. The seal structure will be described later.

Groove-shaped concave portions to which stringers are attached are formed on an outer peripheral surface of the mandrel 11 except for peripheral edges of both end portions of the mandrel 11. In order to clearly show the configurations of the mandrel 11 and the segments 20 and 30, the groove-shaped concave portions are not shown in FIG. 1A and the other drawings showing the mandrel 11 and the segments 20 and 30.

The sectional shape of the mandrel 11, i.e., the shape of an end surface of the mandrel 11 formed by the end surfaces of the first segments 20 and the end surfaces of the second segments 30 is not especially limited as long as it is an annular shape. In the present embodiment, when the composite material structure manufactured by using the mold 10 is, for example, a one-piece barrel (OPB) constituting a fuselage of an aircraft, the shape of the end surface of the mandrel 11 is an oval, not a perfect circle. Needless to say, the sectional shape of the mandrel 11 may be a perfect circle depending on the shape of the composite material structure to be manufactured.

When the shape of the end surface of the mandrel 11 (or the sectional shape of the mandrel 11) is an oval shape, the shapes of the segments 20 and 30 are slightly different from one another. To be specific, when the sectional shape of the mandrel 11 (the shape of the end surface of the mandrel 11) is a perfect circle, the segment front surfaces 21 of the three first segments 20 have the same curvature, and therefore, the three first segments 20 are the same in shape as one another. Similarly, the three second segments 30 are the same in shape as one another. However, when the sectional shape of the mandrel 11 is an oval, in the mandrel 11 shown in, for example, FIG. 1B, the first segment 20 located at an upper position and the second segment 30 located at a lower position are different in surface curvature from the first segments 20 and the second segment 30 located at the other positions, and therefore, these segments are not the same in shape as one another.

As described above, the support rings 12 support both ends of the mandrel 11. Each of the support rings 12 has an annular perfect circle shape. Opposing surfaces of the support rings 12 serve as fixing surfaces for fixing the end surfaces of the mandrel 11. A fixing member (not shown) is provided on each fixing surface so as to correspond to the segment 20 or 30 to be fixed. The shape of the support ring 12 does not have to be a perfect circle as long as the support ring 12 is rotatable. For example, the support ring 12 may have an oval shape.

Figure 2A:
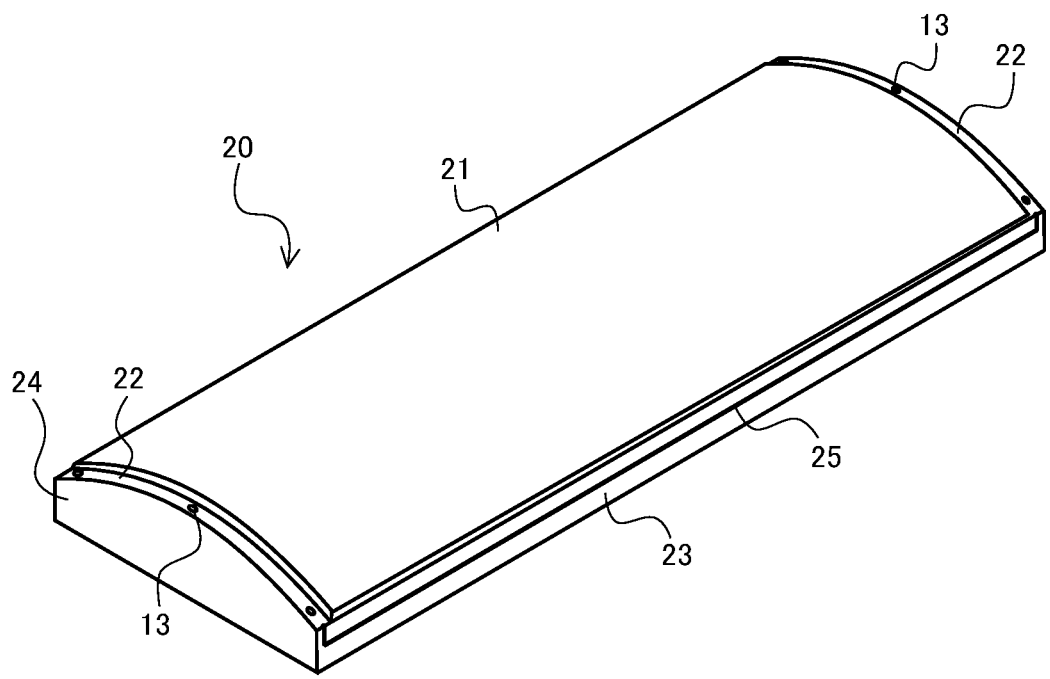
FIG. 2A is a perspective view showing the configuration of a first segment forming a cylindrical structure of the mold shown in FIGS. 1A and 1B.

As shown in FIG. 2A, the first segment 20 is formed in a rectangular flat plate shape. A surface of the first segment 20 which surface constitutes the outer peripheral surface of the mandrel 11 is referred to as a "segment front surface 21," and the segment front surface 21 is a convex curved surface (a convex surface or a projectingly curved surface). Further, the peripheral edge surfaces of both end portions of the first segment 20 are referred to as "segment end portion surfaces 22," and the vacuum suction holes 13 are provided on the segment end portion surfaces 22.

Figure 2B:
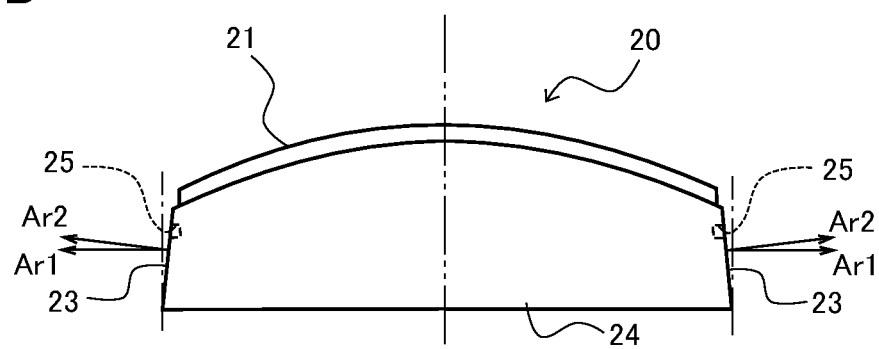
FIG. 2B is a surface view showing an end portion of the first segment shown in FIG. 2A.

A surface of the first segment 20 which surface is coupled to the adjacent second segment 30 is referred to as a "segment side surface 23." As shown in FIGS. 2A and 2B, when the first segment 20 is horizontally arranged with the segment front surface 21 facing upward, the seal grooves 25 are provided on the segment side surfaces 23 in a longitudinal direction of the segment side surface 23. In the present embodiment, as shown in FIG. 2A, both end portions of the seal groove 25 are bent toward the respective segment end portion surfaces 22.

A surface of the first segment 20 which surface constitutes an end surface of the mandrel 11 is referred to as a "segment end surface 24." As shown in FIGS. 2A and 2B, the seal groove 25 cannot be visually confirmed from the segment end surface 24. Therefore, in FIG. 2B, the seal grooves 25 are shown by broken lines. In order to couple the segment side surface 23 of the first segment 20 to the side surface of the second segment 30, a coupling member (not shown) is provided on the segment side surface 23 of the first segment 20. In order to fix the segment end surface 24 to the support ring 12, a fixing member (not shown) is provided on the segment end surface 24.

Each of both segment side surfaces 23 of the first segment 20 faces a horizontal direction or a direction inclined upward relative to the horizontal direction. In the present embodiment, as shown in FIG. 2B, for example, a normal direction of the segment side surface 23 extends in the direction inclined upward relative to the horizontal direction.

As described below, in the present embodiment, when assembling the mandrel 11 in a cylindrical shape, the second segments 30 are first fixed to the support rings 12, and each of the first segments 20 is then fitted between the second segments 30 from a lower side to an upper side to be fixed. Therefore, in order not to hinder this fitting work, the segment side surface 23 of the first segment 20 is only required to be formed such that the normal direction of the segment side surface 23 extends (is directed) in the horizontal direction (direction shown by an arrow Ar1 in FIG. 2B). In other words, when the first segment 20 is arranged horizontally, the segment side surface 23 is located along a vertical direction (direction along a one-dot chain line shown in FIG. 2B).

After the cylindrical composite material structure (for example, the OPB) is molded by using the mold 10 including the mandrel 11, the composite material structure is removed from the mold 10. This removal is performed by disassembling the mandrel 11. The disassembling of the mandrel 11 is performed in the reverse order to the assembling of the mandrel 11. Therefore, each of the first segments 20 is pulled out from between the second segments 30.

On this account, as shown in FIG. 2B, it is preferable that the segment side surface 23 of the first segment 20 be formed such that the normal direction of the segment side surface 23 is inclined upward (toward the segment front surface 21, i.e., in a direction shown by an arrow Ar2 in FIG. 2B). The upward inclination of the normal direction of the segment side surface 23 denotes that the segment side surface 23 is inclined so as to face upward. In other words, the segment side surface 23 is inclined such that a rear-side edge of the segment side surface 23 spreads more outward than a front-side edge of the segment side surface 23. The inclination of the segment side surface 23 form "draft" on the segment side surface 23 of the first segment 20. Thus, the first segment 20 is easily pulled out from between the second segments 30, and therefore, the mandrel 11 is easily disassembled.

The inclination angle (draft angle) of the segment side surface 23 is not especially limited and is suitably set to a preferred angle depending on specific shapes, dimensions, and the like of the mandrel 11 and the mold 10. For example, in the present embodiment, the inclination angle (draft angle) of the segment side surface 23 may be set to 8 to 12 degrees, preferably about 10 degrees. The inclination angles of the opposing segment side surfaces 23 may be equal to each other or different from each other.

Figure 3A:
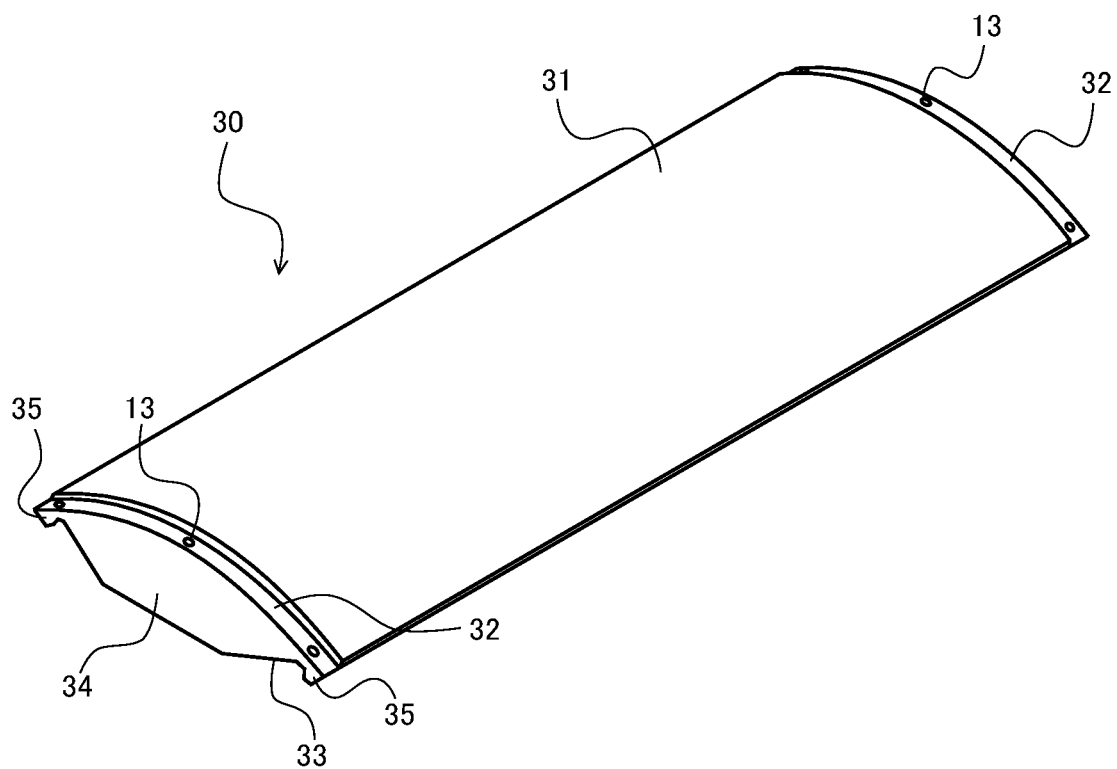
FIG. 3A is a perspective view showing the configuration of a second segment forming the cylindrical structure of the mold shown in FIGS. 1A and 1B.

As shown in FIG. 3A, as with the first segment 20, the second segment 30 is formed in a rectangular flat plate shape. A surface of the second segment 30 which surface constitutes the outer peripheral surface of the mandrel 11 is referred to as a "segment front surface 31," and the segment front surface 31 is a convex curved surface as with the segment front surface 21 of the first segment 20. Further, as with the first segment 20, the peripheral edge surfaces of both end portions of the second segment 30 are referred to as "segment end portion surfaces 32," and the vacuum suction holes 13 are provided on the segment end portion surfaces 32.

A surface of the second segment 30 which surface is coupled to the adjacent first segment 20 is referred to as a "segment side surface 33." Each of both segment side surfaces 33 has a shape that faces a direction inclined downward relative to the horizontal direction. To be specific, both segment side surfaces 33 are inclined such that the width of the second segment 30 increases from a rear side of the second segment 30 toward the segment front surface 31.

As described below, in the present embodiment, when assembling the mandrel 11 in a cylindrical shape, the second segments 30 are first fixed to the support rings 12, and each of the first segments 20 is then fitted between the second segments 30. Therefore, in order not to hinder the fitting work of the first segment 20, it is preferable that the area of the rear side of the second segment 30 fixed first be small. On this account, it is preferable that each of both segment side surfaces 33 of the second segment 30 be formed such that the normal direction of the segment side surface 33 extends downward (direction shown by an arrow Ar3 in FIG. 3B), in other words, the segment side surface 33 is inclined downward.

In order to couple the segment side surface 33 to the segment side surface 23 of the first segment 20, a coupling member (not shown) is provided on the segment side surface 33. A surface of the second segment 30 which surface constitutes the end surface of the mandrel 11 is referred to as a "segment end surface 34." In order to fix the segment end surface 34 to the support ring 12, a fixing member (not shown) is provided on the segment end surface 34 as with the segment end surface 24 of the first segment 20.

An eave portion 35 projecting outward from the segment side surface 33 is provided at an edge portion of the segment side surface 33 of the second segment 30, the edge portion being connected to the segment front surface 31. Therefore, as shown in FIGS. 3A and 3B, when the second segment 30 is viewed from the segment front surface 31, the segment side surfaces 33 facing downward are completely hidden by the eave portions 35.

The degree of the downward inclination of the segment side surface 33 and the degree of the projection of the eave portion 35 are not especially limited and are suitably set in accordance with the specific configuration of the mandrel 11, the specific configuration of the second segment 30, or the specific configuration of the first segment 20 coupled to the second segment 30.

Figure 3B:
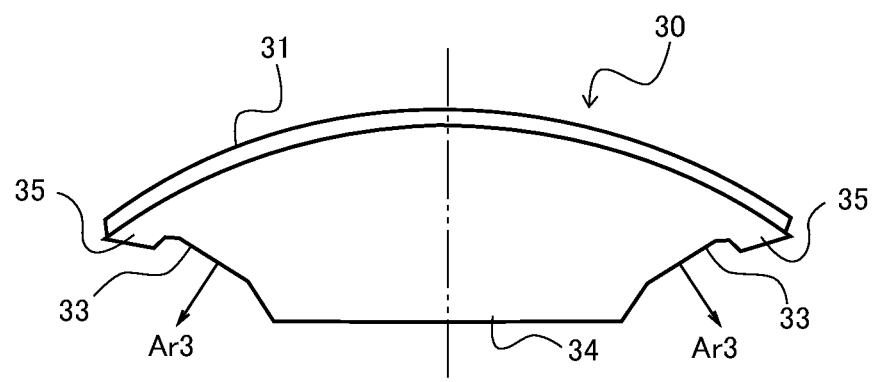
FIG. 3B is a surface view showing an end portion of the second segment shown in FIG. 3A.

As shown in FIG. 3B, an end surface of the eave portion 35 constitutes a part of the segment side surface 33. Therefore, the segment side surface 33 of the second segment 30 is constituted by two surfaces that are a main body side surface of the second segment 30 and the end surface of the eave portion 35 projecting from the main body side surface. However, the specific configuration of the segment side surface 33 is not especially limited, and the segment side surface 33 may be constituted by a single surface without a level difference or may be constituted by three or more surfaces.

In the present embodiment, the end surface of the eave portion 35 in the segment side surface 33 is coupled to a part of the segment side surface 23 of the first segment 20 (see the parts Ps in FIG. 1B). The below-described seal structure is provided on the part of the segment side surface 23 to which part the end surface of the eave portion 35 is coupled. Therefore, the segment side surface 23 of the segment 20 and the segment side surface 33 of the segment 30 do not have to be entirely connected to each other, and as in the present embodiment, a part of the segment side surface 23 and a part of the segment side surface 33 may be connected to each other.

A rear surface of the first segment 20 shown in FIG. 2B and a rear surface of the second segment 30 shown in FIG. 3B are flat surfaces. However, the specific configurations of the first segment 20 and the second segment 30 are not limited to these. Each of the segments 20 and 30 does not have to include the rear surface, and an internal configuration, such as a skeleton structure, for constituting the segment 20 or 30 may be exposed. Since it is preferable that the outer peripheral surface of the mandrel 11 be as smooth as possible, the segment front surface 21 and the segment front surface 31 constituting the outer peripheral surface of the mandrel 11 are only required to be smooth curved surfaces, and it is unnecessary to form a flat surface at a rear side when viewed from the segment front surface 21 or the segment front surface 31.

The segment front surfaces 21 of the first segments 20 and the segment front surfaces 31 of the second segments 30 form the outer peripheral surface of the mandrel 11. Therefore, as described above, the groove-shaped concave portions to which the stringers are attached are formed on the outer peripheral surface of the mandrel 11 except for the segment end portion surface 22 and the segment end portion surface 32 (peripheral edges of both end portions of the mandrel 11). Further, a frame portion, such as a door frame portion or a window frame portion, is formed on at least one of the segment front surface 21 and the segment front surface 31 depending on the type of the composite material structure. It should be noted that the groove-shaped concave portions and the frame portions are not shown in FIGS. 2A, 2B, 3A, and 3B for convenience of explanation.

Assembling of Mold

Next, one example of a method of assembling a plurality of segments 20 and 30 as the mandrel 11 of the mold 10 configured as above (method of assembling the mold 10) will be specifically explained with reference to FIGS. 4 to 6D.

First, as described above, regarding the mold 10 (see FIG. 1A), the six segments 20 and 30 are fixed to the support rings 12 to be assembled as the mandrel 11 that is a single cylindrical structure.

Before the six segments 20 and 30 are assembled as the mandrel 11, some of parts constituting the composite material structure are attached to the six segments 20 and 30. For example, as described above, the groove-shaped concave portions (not shown) are provided on the segment front surfaces 21 of the segments 20 and the segment front surfaces 31 of the segments 30, and stiffeners, such as stringers, are attached to the groove-shaped concave portions. After such parts are attached to the segments 20 and 30, the segments 20 and 30 are assembled to construct the mandrel 11.

Figure 4:
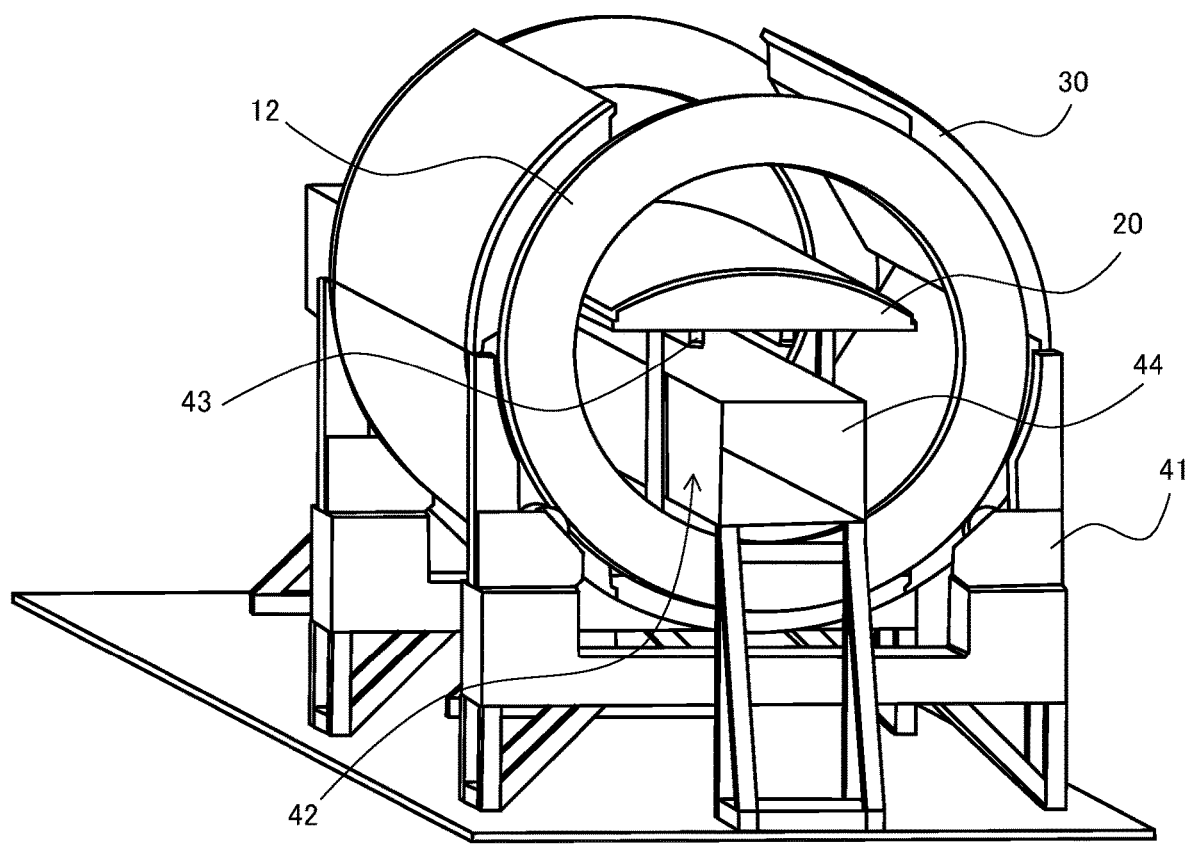
FIG. 4 is a schematic perspective view showing one example of assembling of the mold shown in FIG. 1A.

As shown in FIG. 4, the support rings 12 are supported in a standing state by respective cradles 41 (mandrel support structures) so as to be rotatable. Each of the cradles 41 includes a plurality of support rollers configured to rotate the support ring 12. A pair of support rings 12 are supported by a pair of cradles 41.

As described below, the mandrel 11 is formed by assembling the six segments 20 and 30. When assembling the segments, the support rings 12 are rotated by the cradles 41. With this, the segments 20 and 30 are fixed to the support rings 12 by the same movement that is a lifting movement from a lower side to an upper side, not by different movements among the segments 20 and 30.

A precision rail 42 (mandrel assembling/disassembling apparatus) is provided at a position between the support rings 12 and corresponding to the hollow portions of the annular support rings 12. The precision rail 42 is an assembling apparatus by which the six segments 20 and 30 are fixed and assembled to the support rings 12. As shown in FIG. 4, the precision rail 42 includes a jack portion 43, a rail main body 44, and the like. One first segment 20 or one second segment 30 is placed on an upper side of the jack portion 43, and the jack portion 43 lifts the first segment 20 or the second segment 30 in a direction of 12 o'clock, i.e., upward. The rail main body 44 supports the jack portion 43 and the like and includes, for example, a drive mechanism configured to drive the jack portion 43.

Next, a method of fixing the six segments 20 and 30 to the support rings 12 one by one to assemble the mandrel 11 will be specifically explained.

In the present embodiment, the three first segments 20 and the three second segments 30 are alternately coupled to one another to form an annular shape with the segment front surfaces 21 and the segment front surfaces 31 facing outward. With this, the single cylindrical mandrel 11 is configured. Therefore, for convenience of explanation, in FIGS. 5A to 5D and 6A to 6D, the three first segments 20 are shown as a No. 1 first segment 20a, a No. 2 first segment 20b, and a No. 3 first segment 20c, and the three second segments 30 are shown as a No. 1 second segment 30a, a No. 2 second segment 30b, and a No. 3 second segment 30c.

Figure 5A:
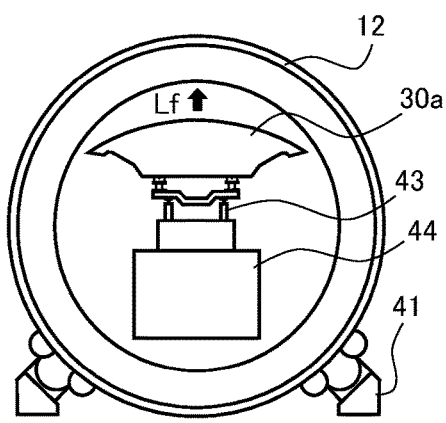
FIGS. 5A to 5D are schematic diagrams showing specific steps of assembling the mold shown in FIG. 4.

First, as shown in FIG. 5A, the No. 1 second segment 30a is placed at the jack portion 43 located on the rail main body 44 and is lifted in the direction of 12 o'clock (a vertically upper direction shown by an arrow Lf in FIG. 5A) by the operation of the jack portion 43 to reach an upper position of the support rings 12. Fixing members (not shown) are provided on the segment end surfaces 34 (see FIGS. 3A and 3B) of the second segment 30a and the fixing surfaces of the support rings 12. With this, as shown in FIG. 5B, the No. 1 second segment 30a is fixed and supported between the support rings 12.

Figure 5B:
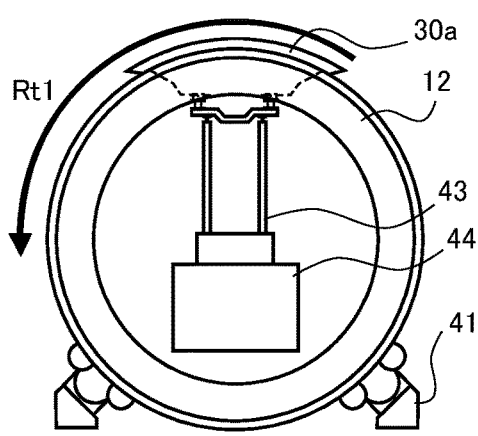

Next, as shown by an arrow Rt1 in FIG. 5B, the support rings 12 are rotated by about 120 degrees. With this, the No. 1 second segment 30a fixed at the upper position in FIG. 5B is moved to a lower left position shown in FIG. 5C. In this state, the No. 2 second segment 30b is placed at the jack portion 43 (see FIG. 5A) and is moved upward by the operation of the jack portion 43. Fixing members (not shown) are provided on the segment end surfaces 34 of the second segment 30b (see FIGS. 3A and 3B) and the fixing surfaces of the support rings 12. With this, as shown in FIG. 5C, the No. 2 second segment 30b is fixed and supported between the support rings 12.

Figure 5C:
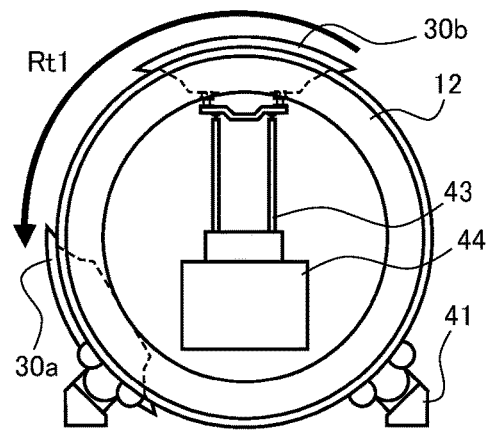
Figure 5D:
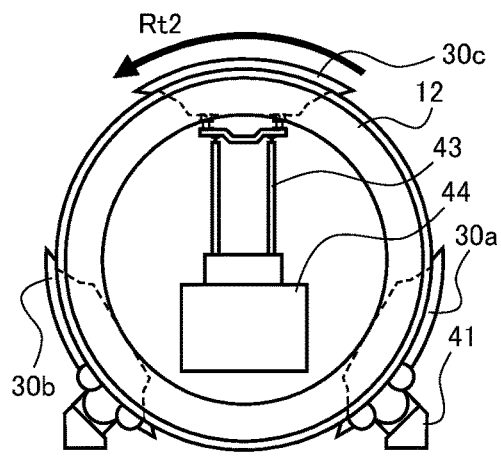

Next, as shown by the arrow Rt1 in FIG. 5C, the support rings 12 are rotated by about 120 degrees. With this, the No. 2 second segment 30b fixed at the upper position in FIG. 5C is moved to the lower left position shown in FIG. 5D, and the No. 1 second segment 30a is moved to a lower right position. In this state, the No. 3 second segment 30c is placed at the jack portion 43 (see FIG. 5A) and is moved upward by the operation of the jack portion 43. Fixing members (not shown) are provided on the segment end surfaces 34 of the second segment 30c (see FIGS. 3A and 3B) and the fixing surfaces of the support rings 12. With this, as shown in FIG. 5D, the No. 3 second segment 30c is fixed and supported between the support rings 12.

After the No. 3 second segment 30a is fixed to the support rings 12, the support rings 12 are rotated by about 60 degrees as shown by an arrow Rt2. When fixing the second segments 30a to 30c at first, the second segments 30a to 30c are fixed at every other fixing positions of the support rings 12, so that the support rings 12 need to be rotated by a rotation angle of 120 degrees corresponding to the fixing positions of two segments. However, since the first segments 20a to 20c different in type from the second segments 30a to 30c are fixed in this step, the rotation angle is 60 degrees corresponding to one segment.

Figure 6A:
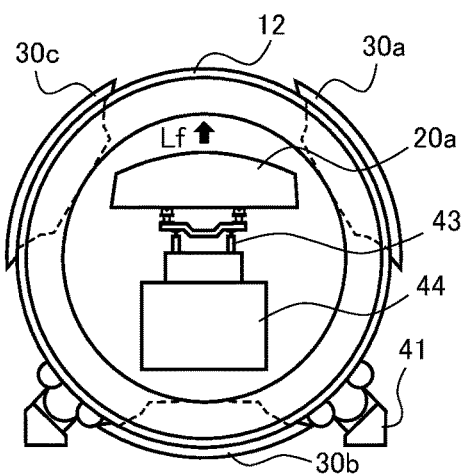
FIGS. 6A to 6D are schematic diagrams showing specific steps of assembling the mold shown in FIG. 4, the steps being performed after the steps shown in FIGS. 5A to 5D.

With this, as shown in FIG. 6A, the No. 3 second segment 30c fixed at the upper position is moved to an upper left position, and the No. 2 second segment 30b and the No. 1 second segment 30a are moved to the lower position and an upper right position, respectively. Therefore, in this state, nothing is fixed at the upper position of the support rings 12 in FIG. 6A.

As shown in FIG. 6A, the No. 1 first segment 20a is placed at the jack portion 43 and lifted in the direction of 12 o'clock shown by an arrow Lf to reach the upper position of the support rings 12. In this state, as shown in FIG. 6B, the No. 1 first segment 20a is inserted between the No. 3 second segment 30c and the No. 1 second segment 30a.

The seal groove 25 and the seal member 26 inserted in the seal groove 25 are provided on each of both segment side surfaces 23 of the first segments 20a to 20c. To be specific, the seal structure configured to seal between the adjacent segments 20 and 30 is provided on each of the segment side surfaces 23 of the first segments 20a to 20c. As described below, according to the seal structure, since the seal member 26 can be crushed in the cross sectional direction without a high moving load, a sealed state can be easily realized between the adjacent segments 20 and 30.

Fixing members (not shown) are provided on the segment end surfaces 24 of the No. 1 first segment 20a (see FIGS. 2A and 2B) and the fixing surfaces of the support rings 12. With this, as shown in FIG. 6B, the No. 1 first segment 20a is fixed between the support rings 12. Further, coupling members (not shown) are provided on both segment side surfaces 23 of the first segments 20a to 20c and both segment side surfaces 33 of the second segments 30a to 30c. With this, the No. 3 second segment 30c and the No. 1 first segment 20a are coupled to each other, and the No. 1 second segment 30a and the No. 1 first segment 20a are coupled to each other.

Figure 6B:
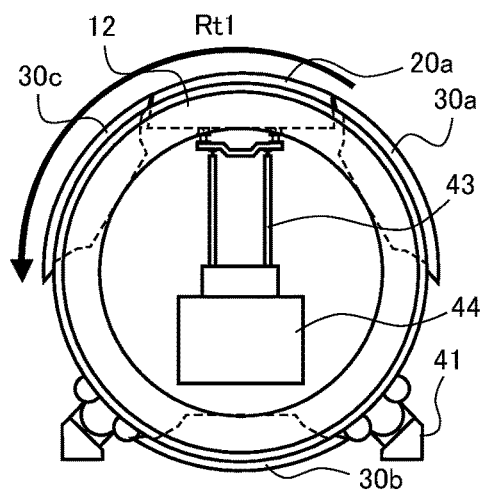

Next, as shown by the arrow Rt1 in FIG. 6B, the support rings 12 are rotated by about 120 degrees. With this, the No. 1 first segment 20a fixed at the upper position in FIG. 6B is moved to the lower left position shown in FIG. 6C. In this state, the upper position of the support rings 12 in FIG. 6C corresponds to a position between the No. 1 second segment 30a and the No. 2 second segment 30b, and nothing is fixed at this position. The No. 2 first segment 20b is placed at the jack portion 43 (see FIG. 6A) and is moved upward in the direction of 12 o'clock by the operation of the jack portion 43. With this, the first segment 20b reaches the upper position of the support rings 12.

Figure 6C:
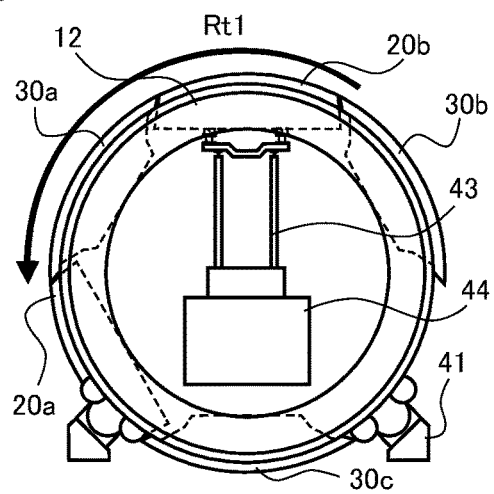

In this state, as shown in FIG. 6C, the No. 2 first segment 20b is inserted between the No. 1 second segment 30a and the No. 2 second segment 30b. As described above, the sealed state between the segments 20 and 30 is realized by the seal structure including the seal groove 25 and the seal member 26. Further, as described above, by the fixing members (not shown) and the coupling members (not shown), the No. 2 first segment 20b is fixed between the support rings 12 and coupled to the No. 1 second segment 30a and the No. 2 second segment 30b.

Next, as shown by the arrow Rt1 in FIG. 6C, the support rings 12 are rotated by about 120 degrees. With this, the No. 2 first segment 20b fixed at the upper position in FIG. 6C is moved to the lower left position shown in FIG. 6D, and the No. 1 first segment 20a is moved to the lower right position. In this state, the upper position of the support rings 12 in FIG. 6D corresponds to a position between the No. 2 second segment 30b and the No. 3 second segment 30c, and nothing is fixed at this position. The No. 3 first segment 20c is placed at the jack portion 43 (see FIG. 6A) and is moved upward in the direction of 12 o'clock by the operation of the jack portion 43. With this, the No. 3 first segment 20c reaches the upper position of the support rings 12.

Figure 6D:
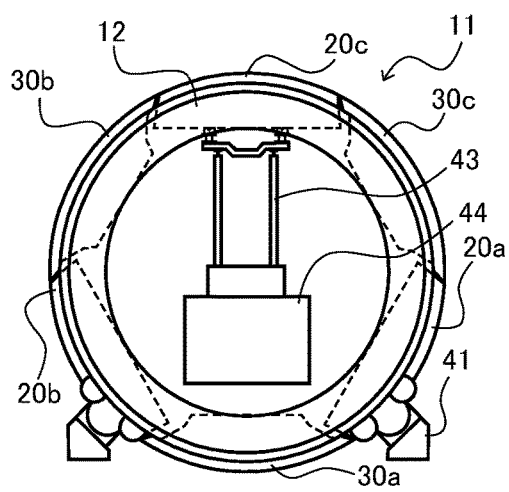

In this state, as shown in FIG. 6D, the No. 3 first segment 20c is inserted between the No. 2 second segment 30b and the No. 3 second segment 30c, and the sealed state between the segments 20 and 30 is realized by the seal structure including the seal groove 25 and the seal member 26. Further, as described above, by the fixing members (not shown) and the coupling member (not shown), the No. 3 first segment 20c is fixed between the support rings 12 and coupled to the No. 2 second segment 30b and the No. 3 second segment 30c.

With this, all the first segments 20a to 20c are fixed to the support rings 12, and all the segments 20a to 20c and 30a to 30c are coupled to and held one another. As a result, as shown in FIG. 1A, the assembling of the mold 10 constituted by the mandrel 11 held by the support rings 12 is completed.

Method of Manufacturing Composite Material Structure

Next, one example of a method of molding (manufacturing) the composite material structure by using the mold 10 assembled as above will be specifically explained with reference to FIGS. 7 to 8C.

As described above, examples of the composite material structure manufactured by the method of manufacturing the composite material structure according to the present embodiment include cylindrical structures, such as the OPB, and typical examples are structures constituting aircrafts. Materials constituting the composite material structure are not especially limited and may be generally a matrix material and a fiber material. The matrix material may be a thermosetting resin or a thermosetting resin composition prepared by adding a material, an additive, or the like to a thermosetting resin. Further, the composite material structure may contain a material other than the thermosetting resin (or the thermosetting resin composition) and the fiber material.

Specific examples of the thermosetting resin include an epoxy resin, a bismaleimide resin, a vinylester resin, an unsaturated polyester resin, a phenol resin, and a silicone resin. However, the thermosetting resin is not especially limited. Among these resins, only one type of resin may be used, or plural types of resins suitably combined may be used. Typically, the epoxy resin is preferably used. The specific chemical structures of these thermosetting resins are not especially limited. A polymer prepared by polymerizing various known monomers may be used, or a copolymer prepared by polymerizing plural monomers may be used. Further, structures, such as the average molecular weight, the main chain, and the side chain, are not especially limited.

Specific examples of the fiber material includes a carbon fiber, an aramid fiber, a nylon fiber, a polyester fiber, and a glass fiber. However, the fiber material is not especially limited. Typically, the carbon fiber having high strength and high rigidity is preferably used. Conditions, such as the shapes, lengths, and diameters of these fiber material, are not especially limited, and conditions suitable for the composite material structure can be selected. Among these fiber materials, only one type of fiber material may be used, or two or more types of fiber materials suitably combined may be used. Further, the fiber materials may be constituted as braid, woven fabric, knit fabric, or the like.

In the method of manufacturing the composite material structure according to the present embodiment, the composite material structure is molded on an outer peripheral surface of the mold 10 configured as above. Specific steps of the method are not especially limited. In the present embodiment, one example of a manufacturing method including ten steps shown in FIG. 7 will be specifically explained.

First, the segments 20 and 30 (see FIGS. 2A, 2B, 3A, and 3B) are subjected to a pretreatment before the segments 20 and 20 are assembled (pretreatment step P01). Details of the pretreatment are not especially limited. For example, the segment front surface 21 or the segment front surface 31 is washed and subjected to a release treatment in order to facilitate the separation of the mold from the composite material structure after the molding.

Next, components of the composite material structure are attached to the segment front surface 21 or the segment front surface 31 (component attaching step P02). Examples of the components include: stringers and frames as skeleton members (stiffeners) of the composite material structure; and an innermost layer of the composite material structure. In the present embodiment, the stringers and the frames are made of a composite material.

For example, as described above, the groove-shaped concave portions (not shown) to which the stringers are attached are formed on the segment front surfaces 21 and the segment front surfaces 31. The groove-shaped concave portions are subjected to the washing treatment, the release treatment, and the like in the pretreatment step, and the stringers as the components are attached to the groove-shaped concave portions. The stringers are skeleton members provided along an axial direction of the hollow composite material structure and are attached to the groove-shaped concave portions provided along the longitudinal direction of the segment front surface 21 or the segment front surface 31. The frames are attached so as to be perpendicular to the stringers. The frames are skeleton members provided along the circumferential direction of the composite material structure. The stringers and the frames are coupled to each other by known coupling members, and the innermost layer is laminated on the outside of the stringers and the frames.

Next, the formation of the below-described seal structure on the segment side surface 23 of the first segment 20 is prepared (seal structure preparing step P03). Specifically, since the seal groove 25 is formed on the segment side surface 23 (see FIGS. 2A and 2B), the below-described seal member is inserted in the seal groove 25. The seal member is formed in a line shape having ends. The length of the seal member is set such that both end portions of the seal member are exposed from the seal groove 25. As described below, the seal member inserted as above is subjected to an end portion treatment.

Next, as described above, the six segments 20 and 30 are assembled as the mandrel 11 (see FIGS. 4 to 6D; mandrel assembling step P04). At this time, each of the first segments 20 is inserted, from a lower side, between the second segments 30 fixed at every other fixing positions of the support rings 12. With this, the adjacent segment side surfaces 23 and 33 of the segments 20 and 30 coupled to each other. The seal member inserted in the seal groove 25 of the segment side surface 23 is crushed in the cross sectional direction by the segment side surface 33. With this, the below-described seal structure is formed and seals between the adjacent segments 20 and 30.

Figure 8A:
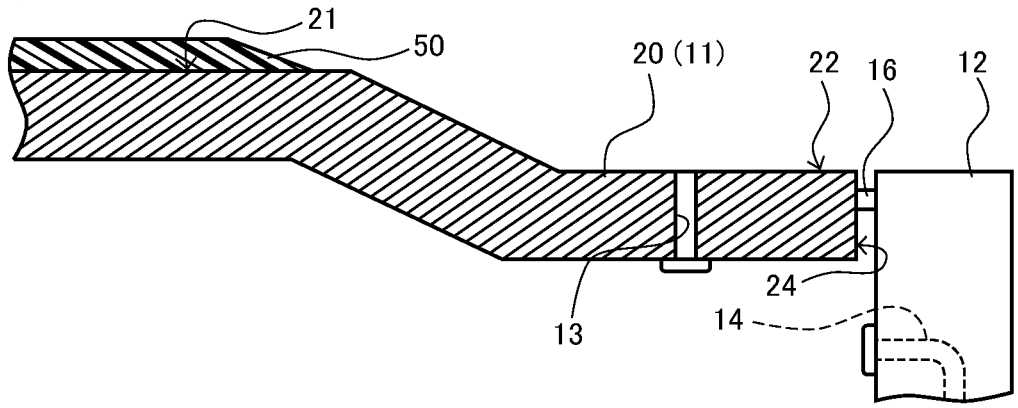
FIGS. 8A to 8C are partial sectional views each showing one end portion of the first segment of the mold for manufacturing the composite material structure shown in FIG. 1A and schematically show a part of a process of manufacturing the cylindrical composite material structure by using the mold.

Next, the prepreg 50 is laminated on the outer peripheral surface of the assembled mandrel 11 (mold 10) as shown in FIG. 8A (prepreg laminating step P05). The prepreg 50 is an intermediate base material configured to become a skin by thermal curing. In the present embodiment, the prepreg 50 is prepared by impregnating the fiber material, such as the carbon fiber, with the thermosetting resin (or the thermosetting resin composition), such as the epoxy resin, and is in a semi-cured state (B stage). The method of laminating the prepreg 50 is not especially limited. Typically, the prepreg 50 is laminated by being attached by an automatic lamination apparatus including a lamination roller while rotating the mandrel 11.

Figure 8B:
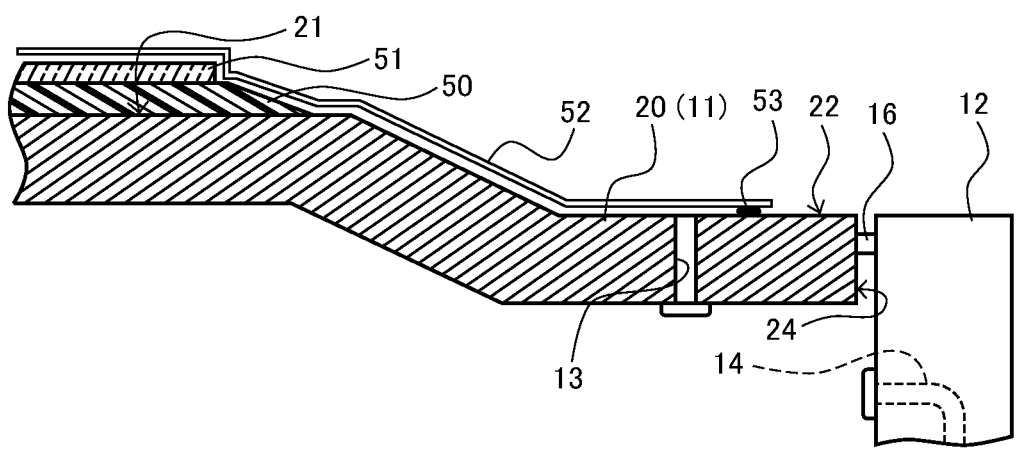
Figure 8C:
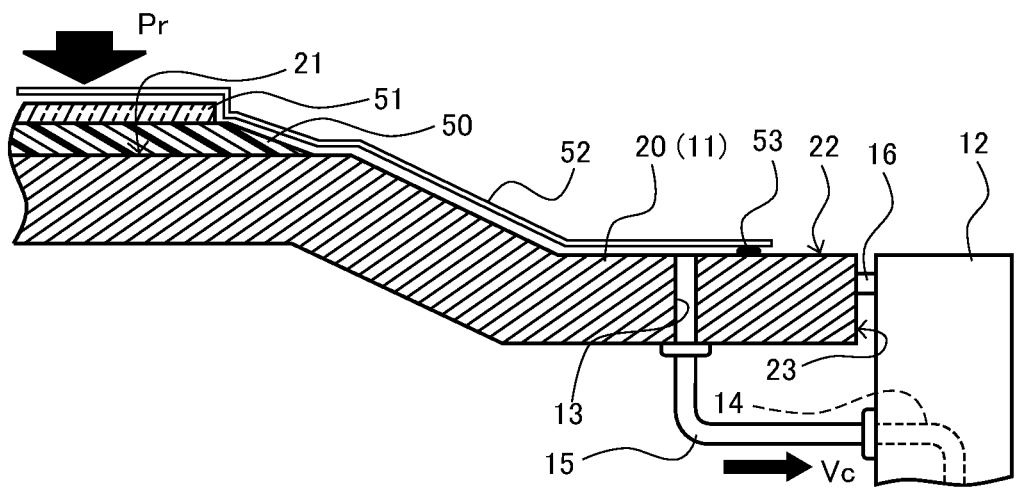

FIGS. 8A to 8C schematically show a part of a section of an end portion of the first segment 20 constituting the mandrel 11. Basically, the second segment 30 has the same configuration as FIGS. 8A to 8C. Therefore, the configuration of the first segment 20 explained with reference to FIGS. 8A to 8C corresponds to the configuration of the second segment 30 unless otherwise noted.

As schematically shown in FIGS. 8A to 8C, since the segment front surface 21 constitutes the outer peripheral surface of the mandrel 11, the prepreg 50 is laminated on the segment front surface 21. As described above, the segment end surface 24 of the first segment 20 is fixed by a fixing member 16. Further, as described above, the vacuum suction holes 13 are provided on the segment end portion surface 22 of the first segment 20. As shown by broken lines in FIGS. 8A to 8C, a vacuum suction pipe 14 is provided at the support ring 12.

After the lamination of the prepreg 50 is completed, a vacuum bag is formed on the outer peripheral surface of the mandrel 11 (mold 10) (vacuum bag forming step P06). The vacuum bag seals the outside of the mold 10. For example, as shown in FIG. 8B, a bagging film 52 is provided so as to cover the entire prepreg 50, and a peripheral portion of the bagging film 52 is sealed by a bonding member 53 (for example, a tackey tape). Thus, the vacuum bag is formed. Therefore, the vacuum bag is constituted by the outer peripheral surface of the mandrel 11 (mold 10) and the bagging film 52. At this time, the bagging film 52 covers not only the segment front surface 21 (the outer peripheral surface of the mandrel 11) on which the prepreg 50 is laminated but also a region of the segment end portion surface 22 at which region the vacuum suction holes 13 are provided.

A caul plate 51 covering the prepreg 50 is attached to the outside of the prepreg 50. The caul plate 51 is a jig for forming a smooth surface at the outside of the composite material structure. Since the bagging film 52 covers the prepreg 50 from the outside of the caul plate 51, the caul plate 51 is located inside the vacuum bag.

After the vacuum bag is formed, the mold 10 is accommodated in an autoclave. The prepreg 50 is subjected to a hardening treatment by applying predetermined pressure to the entire mold 10 at a predetermined temperature while subjecting the inside of the vacuum bag to the vacuum suction (autoclave step P07). Before the mold 10 is accommodated in the autoclave, as shown in FIG. 8C, one end of a connection hose 15 is connected to the vacuum suction hole 13 from a rear surface of the first segment 20. The other end of the connection hose 15 is connected to the vacuum suction pipe 14 provided at the support ring 12. With this, as shown by a block arrow Vc in FIG. 8C, the inside of the vacuum bag can be subjected to the vacuum suction through the vacuum suction hole 13.

When the hardening treatment is started in the autoclave, the predetermined pressure is applied to the vacuum bag by the autoclave from the outside of the mandrel 11 as shown by a block arrow Pr in FIG. 8C and is heated at the predetermined temperature. As described above, since the inside of the vacuum bag is subjected to the vacuum suction, the prepreg 50 is compressed while being heated.

The thermosetting resin in the semi-cured state (B stage) is once softened by heating and is then heated continuously to be completely cured (C stage). Since the vacuum bag is constituted by the outer peripheral surface of the mandrel 11 and the bagging film 52 as described above, the inner peripheral surface of the laminated prepreg 50 contacts the outer peripheral surface of the mandrel 11, and the outer peripheral surface of the prepreg 50 contacts the caul plate 51. During the autoclaving, the prepreg 50 is heated while being pressurized from the outside of the bagging film 52. Therefore, the thermosetting resin of the prepreg 50 is cured in a state where the pressure is applied to the outer peripheral surface of the mandrel 11 by the caul plate 51.

Since the mandrel 11 is configured by coupling the segments 20 and 30, the outer peripheral surface of the mandrel 11 is configured such that the segment front surfaces 21 of the first segments 20 and the segment front surfaces 31 of the second segments 30 are continuous with one another. The below-described seal structure is formed between the adjacent first and second segments 20 and 30 by the seal structure preparing step P03 and the mandrel assembling step P04, and therefore, a satisfactory sealed state is realized. On this account, the inside of the vacuum bag also becomes a satisfactory vacuum state, and the pressure of the autoclave is satisfactorily applied to the prepreg 50.

With this, the skeleton member (stiffener) provided on the outer peripheral surface of the mandrel 11 and the skin formed by curing the prepreg 50 strongly stick together to be integrated with each other. Thus, the composite material structure is molded. Therefore, the inner peripheral surface of the composite material structure is formed as an integral smooth surface by the outer peripheral surface of the mandrel 11, and the outer peripheral surface of the composite material structure is formed as an integral smooth surface by the caul plate 51.

After the hardening treatment is terminated, the mold 10 is carried out of the autoclave, and a debug treatment is performed (debug treatment step P08). For example, the bagging film 52 and the caul plate 51 are detached in the debug treatment. After that, the composite material structure supported by the mandrel 11 is subjected to trimming and perforation (trimming step P09). Then, the mold 10 is removed from the composite material structure. Herein, the mold 10 is removed by disassembling the mandrel 11 (mandrel disassembling step P10). The method of disassembling the mandrel 11 is performed in the reverse order to the above-described method of assembling the mandrel 11. First, the first segments 20a to 20c are pulled out downward one by one to be detached and removed from the inside of the composite material structure, and the second segments 30a to 30c are then moved downward one by one to be detached from the inside of the composite material structure. Thus, the composite material structure is manufactured.

Seal Structure

Next, the seal structure provided between the first segment 20 and the second segment 30 constituting the mandrel 11 will be specifically explained with reference to FIGS. 9A to 10F.

Figure 9A:
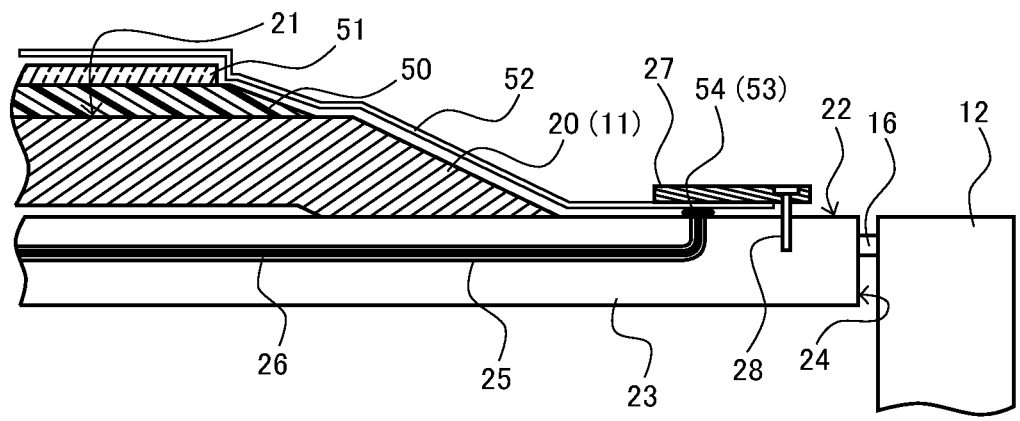
FIGS. 9A and 9B are partial sectional views each showing the mold for manufacturing the composite material structure shown in FIG. 1A and show one example of a seal structure according to the present invention, the seal structure being applied to the mold.
Figure 9B:
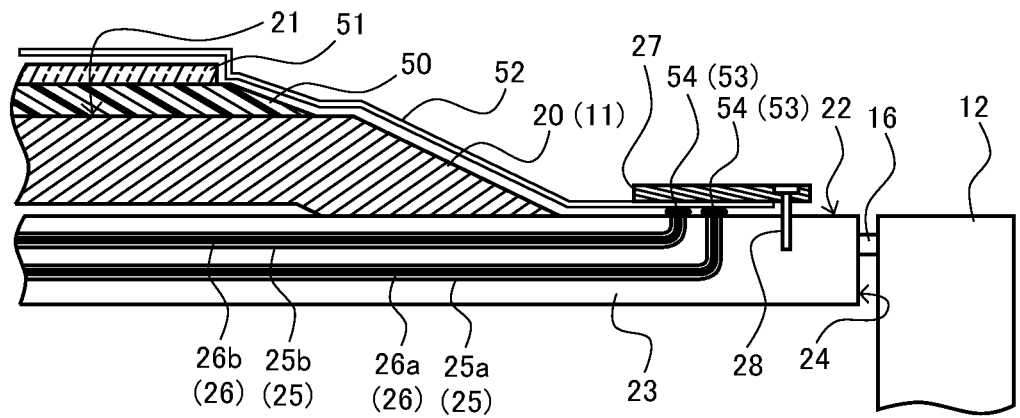

The seal structure according to the present embodiment is provided between the adjacent segments 20 and 30. As shown in FIGS. 9A and 9B, the seal structure is constituted by at least the seal groove 25 and a seal member 26. As shown in FIGS. 10A to 10F, the seal member 26 includes: a lip portion 262 or 265 projecting outward; and a hollow portion 263 therein or a concave portion 264 or 266 on an outer peripheral surface thereof.

The seal groove 25 is provided on at least one of the adjacent segment side surfaces 23 and 33 of the segments 20 and 30 and extends along a longitudinal direction of the segment side surface 23 or 33. In the present embodiment, the seal groove 25 is provided on each of the segment side surfaces 23 of the first segment 20 and is not provided on any of the segment side surfaces 33 of the second segment 30. As described above, the segment side surface 23 of the first segment 20 faces the horizontal direction or the direction inclined upward relative to the horizontal direction. Therefore, the seal structure is provided more easily on the segment side surface 23 of the first segment 20 than on the segment side surface 33 of the second segment 30.

FIGS. 9A and 9B schematically show only one end portion of the first segment 20 as a part of the mandrel 11. Although not shown, the other end portion of the first segment 20 has the same configuration as FIG. 9A or 9B. In FIGS. 9A and 9B, since the segment side surface 23 on which the seal groove 25 is provided is visible from a lateral side of the first segment 20, the segment side surface 23 is shown as a schematic partial side view. However, in FIGS. 9A and 9B, in order to explain the lamination of the prepreg 50 on the segment front surface 21 and the formation of the vacuum bag, the vicinity of the segment front surface 21 is shown as a schematic partial sectional view as with FIGS. 8B and 8C.

The seal member 26 is inserted in the seal groove 25. The seal member 26 seals between the adjacent segments 20 and 30 by coupling the side surfaces of the segments 20 and 30 to each other. When the adjacent segments 20 and 30 are coupled to each other, a predetermined clearance is kept between the segment side surface 23 and the segment side surface 33. With the clearance kept, the seal member 26 is crushed by being brought into contact with the segment side surface 23 or the segment side surface 33. Thus, the sealed state between the segments 20 and 30 is realized.

The seal member 26 used in the present embodiment is not formed in an annular shape but is formed in a line shape having ends. The seal member 26 having such line shape can be easily produced by, for example, extrusion molding at low cost. Since the seal member 26 is disposable, i.e., is basically used once in the autoclave and thrown away, the increase in the manufacturing cost of the composite material structure can be avoided by avoiding the increase in the manufacturing cost of the seal member 26.

As shown in FIG. 9A, at least one seal groove 25 is only required to be formed on the segment side surface 23. However, as shown in FIG. 9B, two seal grooves 25 that are an outer seal groove 25a and an inner seal groove 25b may be formed on the segment side surface 23. Although not shown, three or more seal grooves 25 may be formed on the segment side surface 23. Further, when a plurality of seal grooves 25 are formed, the seal members 26 of the same type may be inserted in the seal grooves 25, or the seal members 26 of different types may be inserted in the seal grooves 25.

For example, according to the configuration shown in FIG. 9B, a first seal member 26a is inserted into the outer seal groove 25a, and a second seal member 26b different from the first seal member 26a is inserted into the inner seal groove 25b. It should be noted that the configuration of an end portion of the seal member 26 will be described later.

As described above, the seal member 26 includes: the lip portion 262 or 265; and at least one of the hollow portion 263 and the concave portions 264 and 266. The specific configurations of the lip portions 262 and 265, the hollow portion 263, and the concave portions 264 and 266 are not especially limited. However, the seal members 26A to 26F in FIGS. 10A to 10F are shown as typical examples.

Figure 10A:
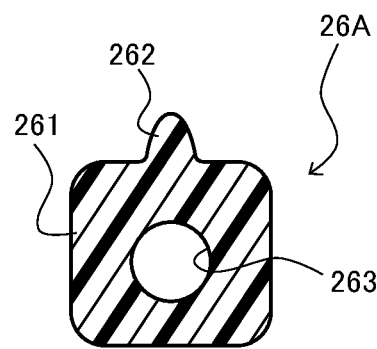
FIGS. 10A to 10F are cross sectional views showing typical examples of a seal member included in the seal structure shown in FIG. 9A or 9B.

As shown in FIG. 10A, the seal member 26A includes: the hollow portion 263 in a seal main body 261 thereof; and an upright lip portion 262 on an outer peripheral surface thereof. A part of the seal main body 261 of the seal member 26A which part contacts a bottom surface of the seal groove 25 when the seal member 26A is inserted in the seal groove 25 is referred to as a seal bottom portion, and a part of the seal main body 261 of the seal member 26A which part is opposed to the seal bottom portion is referred to as a seal upper portion. The upright lip portion 262 is provided so as to project from the substantially flat seal upper portion in a substantially normal direction of the seal upper portion. With the seal member 26A inserted in the seal groove 25, at least a tip end of the upright lip portion 262 projects to the outside of the seal groove 25. A cross section of the seal main body 261 of the seal member 26A has a rectangular shape, and the seal bottom portion is a substantially flat surface.

Figure 10D:
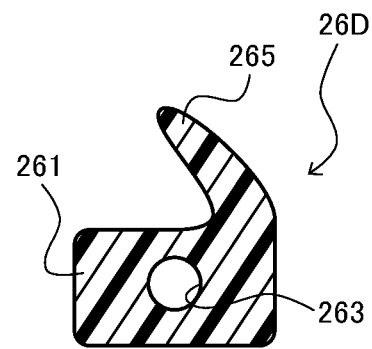
Figure 10B:
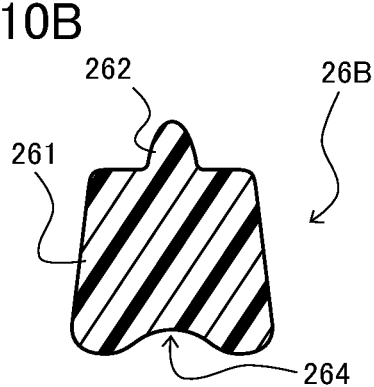

As shown in FIG. 10B, the seal member 26B includes the upright lip portion 262 as with the seal member 26A. The seal member 26B does not include the hollow portion 263 but includes a bottom surface concave portion 264 at the seal bottom portion thereof. The cross section of the seal main body 261 of the seal member 26B has a substantially trapezoidal shape, and the width of the seal upper portion is smaller than the width of the seal bottom portion.

As above, according to the seal members 26A and 26B, the upright lip portion 262 is included at the seal upper portion, and the hollow portion 263 is included in the seal main body 261, or the bottom surface concave portion 264 is included at the seal bottom portion. Each of the hollow portion 263 and the bottom surface concave portion 264 serves as a thinned part in the seal main body 261. Therefore, when the adjacent segment side surfaces 23 and 33 of the segments 20 and 30 are coupled to each other, each of the hollow portion 263 and the bottom surface concave portion 264 is easily crushed by being pressed by the segment side surface 33 of the second segment 30.

The upright lip portion 262 projects outward (in a direction toward the second segment 30) from the segment side surface 23 of the first segment 20 and has elasticity derived from the material of the seal member 26A or 26B. Therefore, the upright lip portion 262 tries to stand in a state of contacting the segment side surface 33. With this, the inside of the seal groove 25 is satisfactorily sealed by the seal main body 261 and the upright lip portion 262.

At this time, when viewing the seal members 26A and 26B from above, the hollow portion 263 or the bottom surface concave portion 264 is located substantially immediately under the upright lip portion 262, so that the hollow portion 263 or the bottom surface concave portion 264 which is easily crushed and the upright lip portion 262 which is biased in the standing direction by the elasticity are located on the substantially same straight line. Therefore, when assembling the mandrel 11, the seal members 26A and 26B can be compressed without applying a high load, and a satisfactory sealed state can be realized between the adjacent segments 20 and 30. As a result, the segments 20 and 30 can be moved by a low load while securing the satisfactory sealed state, and therefore, the positions of the outer peripheral surfaces of the adjacent segments 20 and 30 can be easily adjusted.

According to the seal member 26A shown in FIG. 10A and the seal member 26B shown in FIG. 10B, the upright lip portion 262 in a substantially upright state is included, and the hollow portion 263 or the bottom surface concave portion 264 as a deformation structure by which the seal main body 261 is crushed in a cross sectional direction is located along the upright lip portion 262 on the substantially same straight line as the upright lip portion 262. However, the seal member 26 according to the present embodiment is not limited to this configuration. For example, as shown in FIGS. 10C to 10F, an inclined lip portion 265 may be included instead of the upright lip portion 262.

Figure 10E:
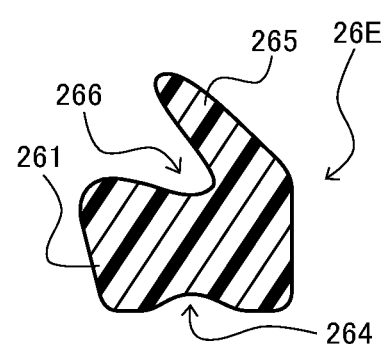
Figure 10C:
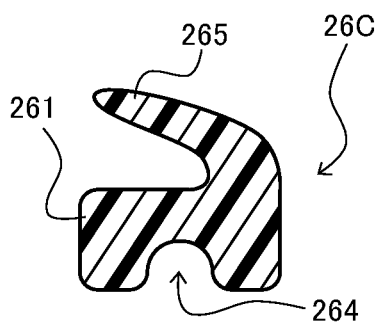

For example, as shown in FIG. 10C, the seal member 26C includes the inclined lip portion 265 at the seal upper portion thereof. The inclined lip portion 265 projects so as to be inclined relative to the normal direction of the seal upper portion. A direction connecting the seal bottom portion and the seal upper portion in the cross section of the seal main body 261 is referred to as a "vertical direction of the cross section of the seal member 26," and a direction perpendicular to the vertical direction is referred to as a "lateral direction of the cross section of the seal member 26." Unlike the seal members 26A and 26B, the cross section of the seal main body 261 of the seal member 26C has a "laterally long" shape, not a "vertically long" shape that extends over the entire cross section of the seal groove 25.

Therefore, in the seal member 26C, a movable space in which the inclined lip portion 265 is movable in an upper-lower direction is formed between the inclined lip portion 265 and the seal main body 261. As with the seal member 26B, the bottom surface concave portion 264 is formed at the seal bottom portion of the seal member 26C. In addition, the movable space can also be regarded as a concave portion provided on the outer peripheral surface of the seal member 26C.

As shown in FIG. 10D, as with the seal member 26C, the seal member 26D includes the inclined lip portion 265, and the cross section of the seal main body 261 has a "laterally long" shape. However, the seal member 26D includes the hollow portion 263 instead of the bottom surface concave portion 264.

As above, according to the seal members 26C and 26D, the inclined lip portion 265 is included at the seal upper portion, and the bottom surface concave portion 264 is included at the seal bottom portion of the seal main body 261 having a "laterally long" cross section, or the hollow portion 263 is included in the seal main body 261. When the adjacent segment side surfaces 23 and 33 of the segments 20 and 30 are coupled to each other, the inclined lip portion 265 is easily pressed downward by the existence of the movable space immediately under the inclined lip portion 265, but the inclined lip portion 265 tries to stand by its elasticity in a state of contacting the segment side surface 33. Further, according to the seal main body 261 that is "laterally long," the bottom surface concave portion 264 or the hollow portion 263 is crushed in accordance with the pressing of the inclined lip portion 265. With this, the inside of the seal groove 25 is satisfactorily sealed by the seal main body 261 and the inclined lip portion 265.

Further, the seal member 26 according to the present embodiment may include the inclined lip portion 265, and the width of the seal upper portion may be larger than the width of the seal bottom portion.

For example, as shown in FIG. 10E, the seal member 26E includes the inclined lip portion 265, and the bottom surface concave portion 264 is formed at the seal bottom portion. In addition, the width of the seal upper portion is larger than the width of the seal bottom portion, and an upper surface concave portion 266 is formed at a position of the seal upper portion which position is adjacent to the inclined lip portion 265.

Figure 10F:
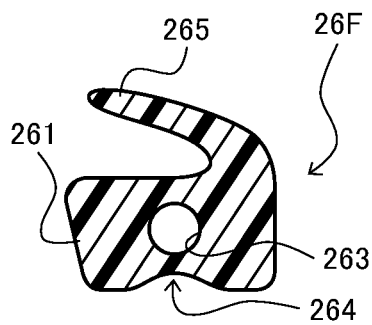

Further, as shown in FIG. 10F, the seal member 26F includes the inclined lip portion 265, and the bottom surface concave portion 264 is formed at the seal bottom portion. In addition, the width of the seal upper portion is larger than the width of the seal bottom portion, and the hollow portion 263 is formed in the seal main body 261.

As above, according to the seal members 26E and 26F, the inclined lip portion 265 is included at the seal upper portion larger in width than the seal bottom portion, and the bottom surface concave portion 264 is included at the seal bottom portion, or the hollow portion 263 is included in the seal main body 261. When the adjacent segment side surfaces 23 and 33 of the segments 20 and 30 are coupled to each other, the inclined lip portion 265 is easily pressed downward by the existence of the movable space immediately under the inclined lip portion 265, but the inclined lip portion 265 tries to stand by its elasticity in a state of contacting the segment side surface 33. Further, according to the seal main body 261, the bottom surface concave portion 264 or the hollow portion 263 is crushed in accordance with the pressing of the inclined lip portion 265. In addition, since the seal upper portion is wide, the seal groove 25 can be satisfactorily sealed in a width direction thereof.

Especially, when the upper surface concave portion 266 is formed in addition to the movable space as in the seal member 26E, or when the hollow portion 263 is formed in addition to the movable space as in the seal member 26F, an edge portion of the wide seal upper portion easily moves toward an inner side of the seal main body 261 by the deformation of the upper surface concave portion 266 or the hollow portion 263. Therefore, the sealed state in the lateral direction of the cross section can be improved by the wide seal upper portion. With this, the inside of the seal groove 25 is satisfactorily sealed by the seal main body 261, the inclined lip portion 265, and the wide seal upper portion.

The selection from the seal members 26A to 26F shown in FIGS. 10A to 10F is not especially limited. The seal member 26 having a preferred cross-sectional shape can be selected depending on various conditions, such as the degree of the seal performance required for the seal structure, the material of the seal member 26, and moving loads of the segments 20 and 30. Further, as described below, when a plurality of seal grooves 25 are formed on the segment side surface 23, the seal members 26 having different cross sections can be selected depending on conditions required for the respective seal grooves 25.

For example, according to the configuration shown in FIG. 9B, one of the seal members 26C to 26F each including the inclined lip portion 265 can be used as the first seal member 26a inserted in the outer seal groove 25a, and the seal member 26A or 26B including the upright lip portion 262 can be used as the second seal member 26b inserted in the inner seal groove 25b.

High pressure is applied from the outside of the seal groove 25 by the autoclave. Therefore, any one of the seal members 26C to 26F is arranged in the outer seal groove 25a such that the pressure is applied to the movable region located immediately under the inclined lip portion 265. With this, the inclined lip portion 265 can be strongly biased toward the standing side by not only the elasticity derived from the material but also the pressure difference. Thus, the further satisfactory sealed state can be realized.

The inside of the seal groove 25 faces the inside of the vacuum bag. In the thermal curing by the autoclave, the matrix resin (thermosetting resin) constituting the prepreg 50 is once softened before being cured. At this time, there is a possibility that the softened matrix resin flows toward the seal groove 25. Therefore, it is preferable that the leak of the matrix resin be effectively prevented or suppressed.

To be specific, the second seal member 26b inserted in the inner seal groove 25b is required to have performance (pressure seal performance) of redundantly sealing high pressure outside the vacuum bag, together with the first seal member 26a inserted in the outer seal groove 25a. In addition, the second seal member 26b inserted in the inner seal groove 25b is required to have performance (matrix resin seal performance) of preventing the leak of the softened matrix resin in the vacuum bag. Therefore, the seal member 26A or 26B including the upright lip portion 262 is arranged in the inner seal groove 25b.

According to the seal member 26, the high pressure outside the vacuum bag can be satisfactorily sealed (the satisfactory pressure seal performance can be realized) by the crushed upright lip portion 262. In addition, since the movable region and the upper surface concave portion 266 are not provided around the upright lip portion 262, the upright lip portion 262 does not incline unlike the inclined lip portion 265. Therefore, the softened matrix resin generated in the vacuum bag can be satisfactorily stopped (the satisfactory matrix resin seal performance can be realized) by the upright lip portion 262. In addition, since the upper surface concave portion 266 and the like are not included as described above, the matrix resin can be prevented from staying in a concave portion at an outer periphery of the seal member 26.

Configuration of End Portion of Seal Member

Next, a preferred configuration of the end portion of the seal member 26 in the seal structure configured as above will be specifically explained with reference to FIGS. 9A, 9B, and 11A to 12D.

In the seal structure according to the present embodiment, the seal member 26 inserted in the seal groove 25 is formed in a line shape having ends, not an annular shape. As described above, regarding the cross sectional direction of the seal member 26, by the lip portions 262 and 265, the hollow portion 263, and the concave portions 264 and 266 (see FIGS. 10A to 10F), the sealed state can be formed by compressing the seal member 26 without applying a high load. On the other hand, regarding the longitudinal direction of the seal member 26, the expansion (linear expansion) generated in the longitudinal direction by the heating during the autoclaving can be easily adjusted by both end portions of the seal member 26.

Specifically, for example, as shown in FIGS. 9A and 9B, the linear expansion of the seal member 26 can be adjusted only by pressing a seal end portion pressing member 27 against the end portion of the seal member 26 such that the end portion is not exposed. The seal groove 25 may have a line shape including an end portion that reaches the segment end surface 24. However, as shown in FIGS. 9A and 9B, it is preferable that the end portion of the seal groove 25 be bent toward the segment end portion surface 22. With this, an opening of the end portion of the seal groove 25 is exposed on the segment end portion surface 22 of the first segment 20, and therefore, the seal end portion pressing member 27 can be provided on the segment end portion surface 22.

The segment end surface 24 of the first segment 20 is fixed to the support ring 12 through the fixing member 16. Therefore, if the seal end portion pressing member 27 is provided on the segment end surface 24, this may influence the movement of the first segment 20 during the assembling of the mandrel 11 and the fixing of the first segment 20 to the support ring 12. However, since the seal end portion pressing member 27 is provided on the segment end portion surface 22, such influences on the assembling of the mandrel 11 can be avoided.

Further, as shown in FIGS. 9A and 9B, an edge portion of the bagging film 52 constituting the vacuum bag reaches the segment end portion surface 22. When the end portion of the seal member 26 reaches the segment end portion surface 22, the bagging film 52 also covers an upper side of the end portion of the seal member 26, and the seal end portion pressing member 27 can press the end portion of the seal member 26 from above.

Figure 11A:
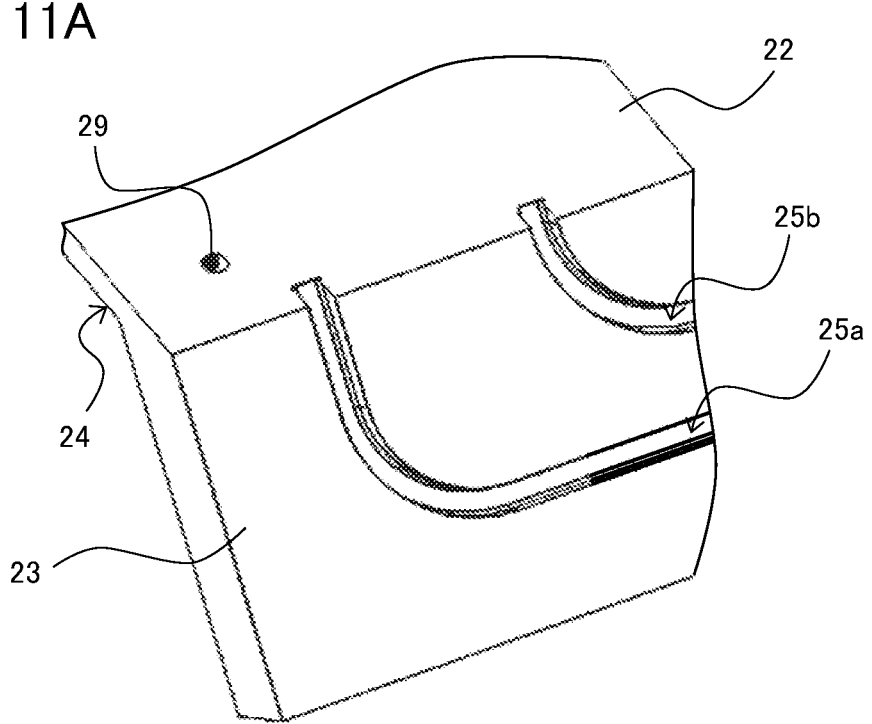
FIG. 11A is a partial perspective view of the first segment and shows that a seal end portion pressing member included in the seal structure shown in FIG. 9A or 9B is not attached yet.
Figure 11B:
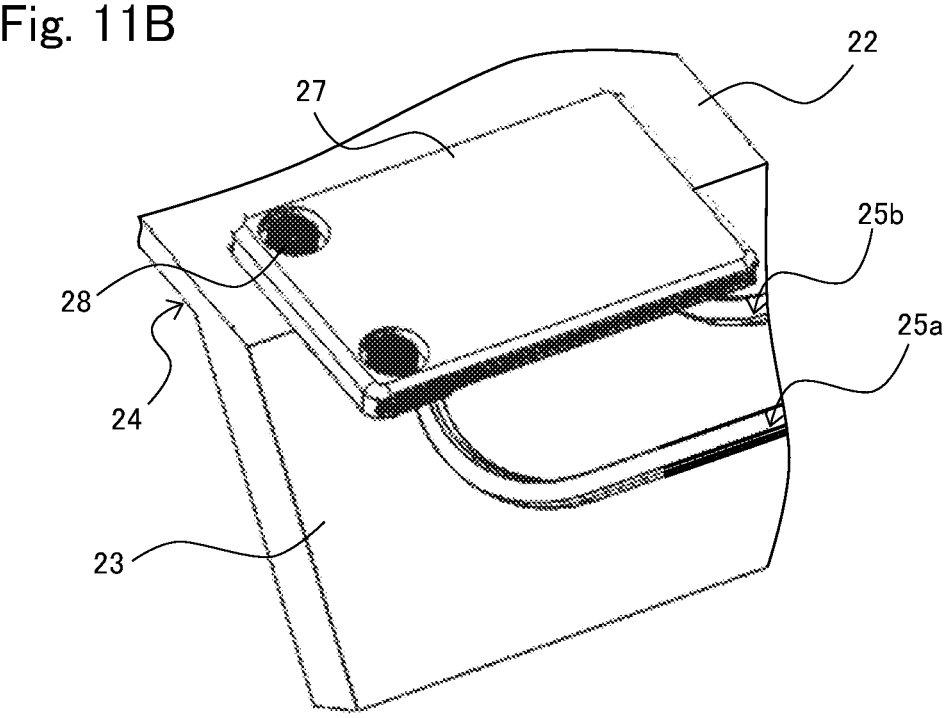
FIG. 11B is a partial perspective view of the first segment and shows that the seal end portion pressing member is attached to the first segment shown in FIG. 11A.

The specific configuration of the seal end portion pressing member 27 is not especially limited. As shown in FIGS. 9A, 9B, and 11B, the seal end portion pressing member 27 is only required to be a plate-shaped member having rigidity and be fixed to the segment end portion surface 22 of the first segment 20 by a known fastening member 28 (for example, a bolt). When the seal end portion pressing member 27 has rigidity, the seal end portion pressing member 27 can be pressed against the end portion of the seal member 26 by fixing only one of both end portions of the seal end portion pressing member 27 with the fastening member 28 such that the end portion of the seal member 26 is not exposed. With this, as shown in FIGS. 9A, 9B, and 11A, a fastening member insertion hole 29 (shown only in FIG. 11A) can be provided at a position closer to the segment end surface 24 than the seal groove 25. Therefore, for example, an opening portion for the fastening member 28 does not have to be formed on the bagging film 52, and therefore, the degree of vacuum of the vacuum bag can be prevented from deteriorating.

As described above, the cross section of the seal member 26 includes the lip portion 262 or 265, the hollow portion 263, the concave portion 264 or 266, and the like (see FIGS. 10A to 10F). Therefore, even when the seal member 26 is inserted in the seal groove 25, a gap is necessarily formed between the opening of the end portion of the seal groove 25 exposed on the segment end portion surface 22 and the end portion of the seal member 26. On this account, as shown in FIGS. 9A and 9B, the opening of the end portion of the seal groove 25 and the end portion of the seal member 26 are only required to be covered with a bonding member 54 (for example, a tackey tape) and then pressed by the seal end portion pressing member 27.

Especially when a plurality of seal grooves 25 are provided, and a plurality of seal members 26 are used, the end portions of the seal members 26 are covered with the bonding member 54, and with this, the end portions of the seal members 26 are connected to one another, and therefore, the seal members 26 can be formed as a single seal member. Thus, the more satisfactory and stable sealed state can be realized between the adjacent segments 20 and 30.

As described above, the bonding member 53 seals the entire peripheral portion of the bagging film 52. The bonding member 53 needs to be connected to the bonding member 54 covering the end portion of the seal member 26. With this, the vacuum bag sealed by the bonding members 53 and 54 and the seal member 26 is formed. In the schematic sections shown in FIGS. 9A and 9B, only the bonding member 54 is shown. However, in order to indicate that the bonding member 53 is connected to the bonding member 54, the reference sign 53 with parentheses is also shown.

Next, one example of the adjustment of the end portions of the seal members 26 by the seal end portion pressing member 27 will be explained by using an example in which as shown in FIGS. 9B, 11A, and 11B, the outer seal groove 25a and the inner seal groove 25b are provided as the seal grooves 25, and the first seal member 26a and the second seal member 26b are used as the seal members 26.

Figure 12A:
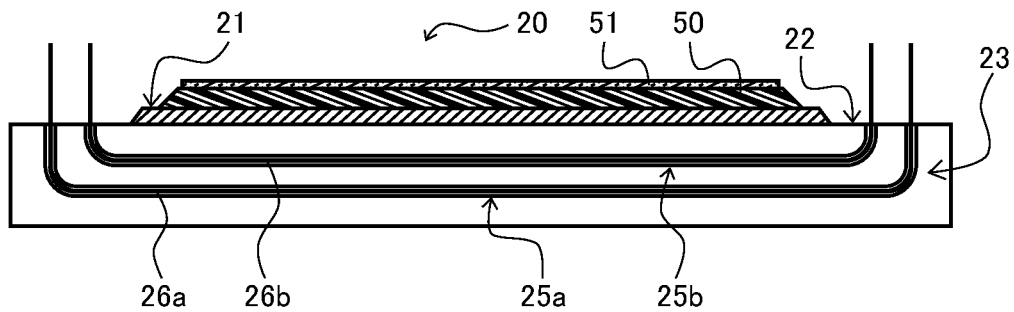
FIGS. 12A to 12D are schematic process diagrams showing a process of constructing the seal structure shown in FIG. 9B.

First, as schematically shown in FIG. 12A, the first seal member 26a is inserted in the outer seal groove 25a formed on the segment side surface 23 of the first segment 20, and the second seal member 26b is inserted in the inner seal groove 25b formed on the segment side surface 23 of the first segment 20. Both end portions of the first seal member 26a and both end portions of the second seal member 26b are exposed from the openings of the end portions of the outer seal groove 25a and the openings of the end portions of the inner seal groove 25b on the segment end portion surface 22. It should be noted that the prepreg 50 is laminated on the segment front surface 21, and the caul plate 51 is placed on the prepreg 50.

Figure 12B:
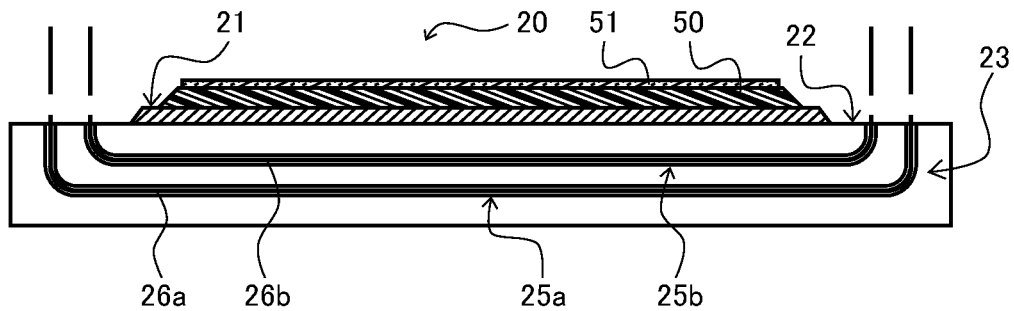
Figure 12C:
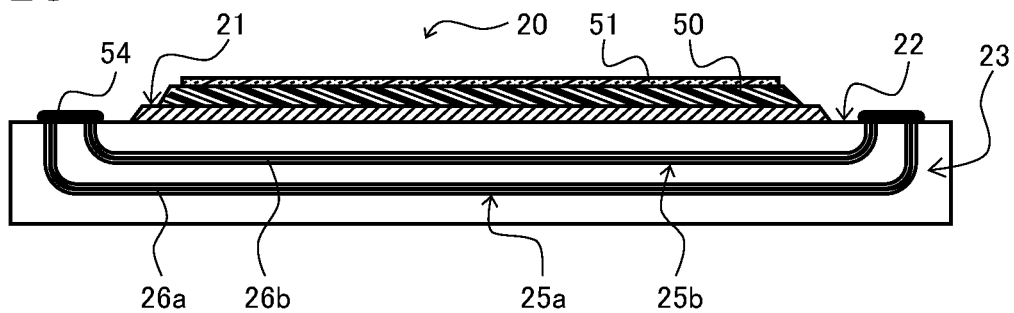

Next, as shown in FIG. 12B, each of both end portions of the first seal member 26a exposed from the openings of the end portions of the outer seal groove 25a and both end portions of the second seal member 26b exposed from the openings of the end portions of the inner seal groove 25b is cut so as to have a length of about several millimeters from the segment end portion surface 22. Then, as shown in FIG. 12C, each of the bonding members 54 cover the opening of the end portion of the outer seal groove 25a and the opening of the end portion of the inner seal groove 25b so as to connect the end portion of the first seal member 26a and the end portion of the second seal member 26b to each other. With this, the above-described end portion treatment with respect to the seal member 26 is completed.

By this end portion treatment, the first seal member 26a and the second seal member 26b can be regarded as a single seal member. The single seal member has an annular structure in appearance. In the present embodiment, two seal grooves 25 (the outer seal groove 25a and the inner seal groove 25b) are provided on the segment side surface 23, and two seal members 26 (the first seal member 26a and the second seal member 26b) are inserted in the seal grooves 25. When the number of seal grooves 25 is one, and the number of seal members 26 is one, the end portion treatment is completed by cutting the end portion of the seal member 26 and covering the end portion with the bonding member 54. Therefore, in the end portion treatment with respect to the seal member 26, the formation of the annular structure by the bonding members 54 is not essential.

Figure 12D:
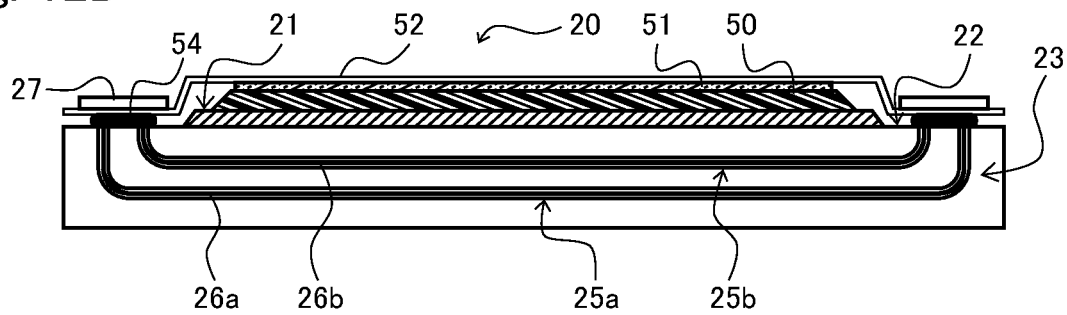

After that, as shown in FIG. 12D, the bagging film 52 covers the segment front surface 21 of the first segment 20 (i.e., covers the prepreg 50 formed on the outer peripheral surface of the mandrel 11 and the caul plate 51 placed on the prepreg 50), and the seal end portion pressing members 27 are attached onto the bagging film 52. With this, the seal end portion pressing member 27 presses, from above the bagging film 52, the bonding member 54 by which the end portion of the first seal member 26a and the end portion of the second seal member 26b are connected to each other. Therefore, the end portions of the first seal member 26a and the second seal member 26b can be effectively prevented from being exposed from the segment end portion surface 22 even during the autoclaving.

The bonding member 53 for bonding the peripheral portion of the bagging film 52 and the fastening member 28 (see FIG. 9B) for fixing the seal end portion pressing member 27 are not shown in FIG. 12D for convenience of explanation. The bonding member 54 covering the openings of the end portions of the seal grooves 25 is not limited to the configurations shown in FIGS. 12C and 12D. Without connecting the end portion of the first seal member 26a and the end portion of the second seal member 26b as schematically shown in FIG. 9B, only the opening of the end portion of the outer seal groove 25a may be covered with one bonding member 54, and only the opening of the end portion of the inner seal groove 25b may be covered with another bonding member 54.

Modified Example

Figure 7A:
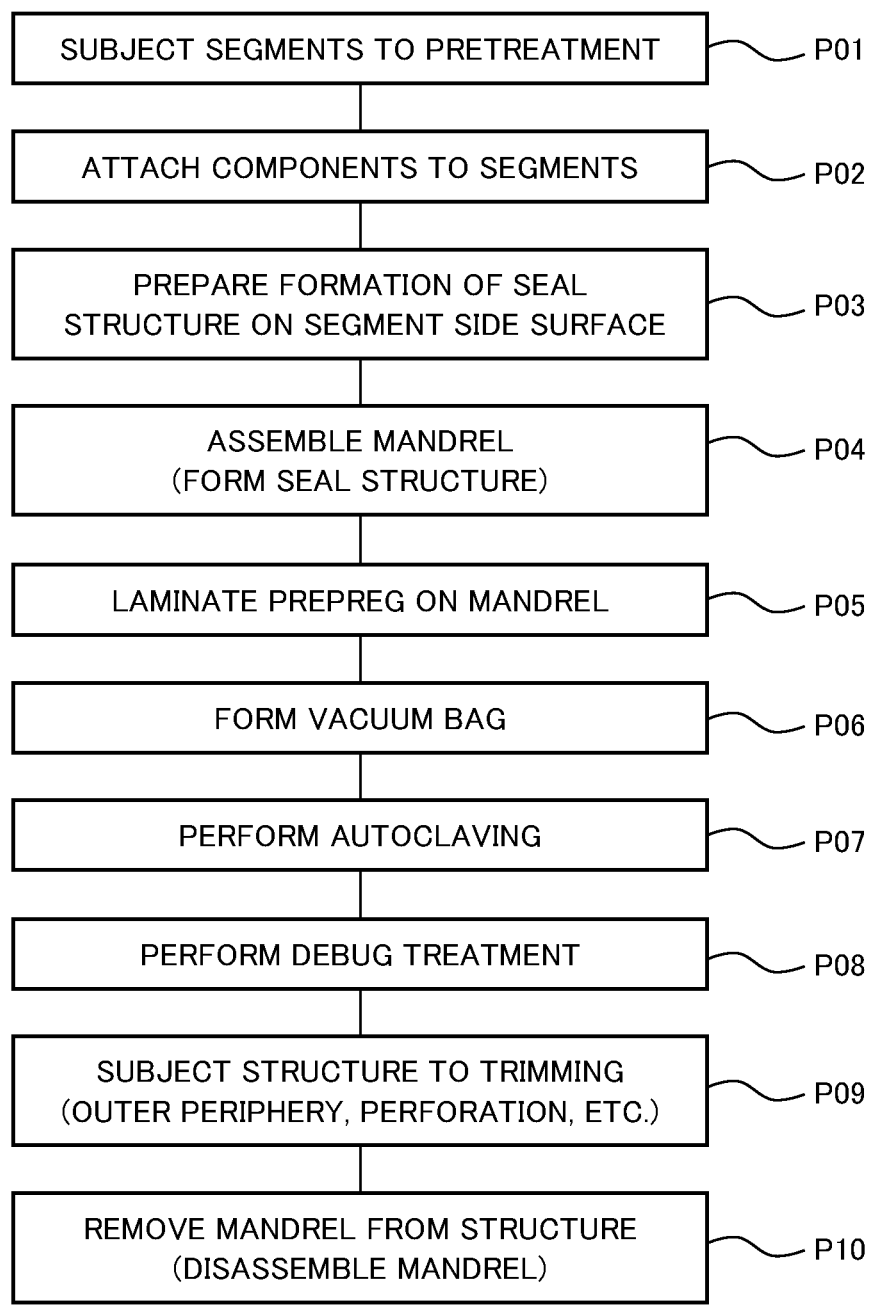
FIG. 7 is a process diagram showing one example of the method of manufacturing the composite material structure according to the present embodiment.

The present embodiment describes the method of manufacturing the composite material structure, the method including a plurality of steps shown in FIG. 7, for example. However, the manufacturing method according to the present disclosure is not limited to this. The manufacturing method may be such that: the vacuum bag is formed by laminating the prepreg 50 on the outer peripheral surface of the mold 10 including the above-described seal structure; the entire mold 10 is subjected to autoclaving while subjecting the inside of the vacuum bag to the vacuum suction; and with this, the prepreg 50 is thermally cured while being pressurized. Therefore, in the manufacturing method according to the present disclosure, some of the steps P01 to P10 shown in FIG. 7 may be omitted, or a step(s) not shown in FIG. 7 may be added.

The mold used in the method of manufacturing the composite material structure according to the present disclosure is not limited to the mold 10 (see FIGS. 1A to 4) including the mandrel 11 constituted by the six segments 20 and 30 as described in the present embodiment. The mold according to the present disclosure is only required to be located inside a hollow composite material structure, be constituted by a plurality of segments, and be kept as a single structure by coupling adjacent side surfaces of the segments to each other.

The specific shape of the mold is not limited to the above-described cylindrical shape (a hollow shape with a substantially constant overall diameter) and may be a conical tubular shape (a hollow shape that decreases in diameter from one end to the other) or a truncated cone tubular shape (a hollow shape in which diameters of both ends are different from each other, and an intermediate diameter gradually changes). The seal structure according to the present disclosure is only required to be provided at the adjacent side surfaces of the segments constituting the mold configured as above. Further, the shape of each segment is not limited to the rectangular flat plate shape, and various shapes may be adopted as long as the segments can constitute the mandrel 11 as a single structure.

Further, in the present embodiment, the mandrel 11 is constituted by the three first segments 20 and the three second segments 30 (see FIG. 1B). However, the configuration of the mandrel 11 is not limited to this. For example, the number of segments may be five or less or may be seven or more. The types of the segments are not limited to two types that are the first segment 20 and the second segment 30. A segment different in type from the segments 20 and 30 may be included, or two or more types of segments different in type from the segments 20 and 30 may be used. Or, the mandrel 11 may be constituted by segments of only one type.

As above, according to the mold of the present embodiment, the number of divided parts of the mold and the shapes of the individual segments are not especially limited as long as the mandrel constituted by plural types of segments is fixed to annular holding members, such as the support rings 12, to be kept in a hollow shape. To be specific, according to the mold of the present embodiment, the specific shapes of the segments, the types of the segments, the number of segments, and the like are not especially limited as long as the mandrel (single structure) is assembled by connecting a plurality of segments each having a substantially rectangular shape and divided along lines extending in an axial direction of the mandrel. The annular holding members holding the plurality of segments constituting the mandrel are not limited to the support rings 12, and different members may be used. For example, end rings may be used instead of the support rings 12.

In the present embodiment, the seal groove is provided at the first segment 20 including the segment side surfaces 23 facing the horizontal direction or the direction inclined upward relative to the horizontal direction. However, the configuration of the seal groove is not limited to this. The seal groove may be provided on the segment side surface 33 of the second segment 30, or the segment grooves may be provided on both the segment side surface 23 and the segment side surface 33. To be specific, in the present embodiment, some of the segments have the seal grooves on the side surfaces, and the other segments do not have the seal grooves. However, all the segments may have the seal grooves.

In the present embodiment, the seal grooves are provided only at the first segments 20. However, the configuration of the seal grooves is not limited to this. To be specific, the seal groove may be provided on only one of the adjacent side surfaces of the segments, or the seal structures may be provided on both of the adjacent side surfaces of the segments. Examples of a case where the seal grooves are provided at all the segments include a configuration in which the seal groove is provided on only one of both side surfaces of each segment and a configuration in which the seal grooves are provided on both side surfaces of each segment. When the seal groove is provided on only one of both side surfaces of each segment, this corresponds to the configuration in which the seal groove is provided on only one of the adjacent side surfaces of the segments. When the seal grooves are provided on both side surfaces of each segment, this corresponds to the configuration in which the seal grooves are provided on both of the adjacent side surfaces of the segments.

When the seal grooves are provided at both of the adjacent segments, it is preferable that the seal grooves be displaced from each other. One example may be a configuration in which: the outer seal groove and the first seal member are provided on one of the adjacent side surfaces of the segments; and the inner seal groove and the second seal member are provided on the other side surface. Further, in the present embodiment, the number of seal grooves formed on the side surface of the segment is one (see FIG. 9A) or two (see FIG. 9B), and the number of seal members each inserted in the seal groove is one or two. However, the number of seal grooves and the number of seal members are not limited to these. The number of seal grooves may be three or more, and the number of seal members may be three or more. It should be noted that when a plurality of seal grooves are provided on the side surface of the segment, a component (for example, a vacuum suction hole) for performing the vacuum suction between the seal grooves may be additionally provided.

The specific configuration of the seal member inserted in the seal groove is not especially limited. As described above, the seal member is only required to: include the lip portion; and be hollow therein or include the concave portion on the outer peripheral surface thereof. The specific shape of the lip portion is not especially limited. The lip portion may be the upright lip portion 262, the inclined lip portion 265, or a lip portion having a different shape and is only required to have such a shape as to extend at the seal upper portion along the longitudinal direction of the seal main body 261.

The concave portion is only required to be formed on at least the seal bottom portion. However, as described above, the concave portion may be formed on the seal upper portion so as to be located near the lip portion, or although not shown, the concave portion may be formed on the side surface of the seal main body. Basically, the hollow portion formed in the seal main body is only required to have a substantially circular section. However, the hollow portion may have an oval section or a polygonal section. As with the lip portion, each of the hollow portion and the concave portion is only required to have such a shape as to extend along the longitudinal direction of the seal main body 261 in the seal main body or on the outer peripheral surface of the seal main body.

The width of the cross section of the seal member is not especially limited. The seal upper portion and the seal bottom portion may be substantially the same in width as each other (see FIGS. 10A, 10C, and 10D). The seal upper portion may be smaller in width than the seal bottom portion (see FIG. 10B). The seal upper portion may be larger in width than the seal bottom portion (see FIGS. 10E and 10F). A wide portion may be formed between the seal upper portion and the seal bottom portion (the side surface of the seal main body). The width of the seal member may be reduced by the formation of the above-described concave portion. A protruding portion may be formed on the side surface of the seal main body.

As above, a method of manufacturing a composite material structure according to the present disclosure is a method of manufacturing a hollow composite material structure including a skin constituted by at least a thermosetting resin composition and a fiber material, the method using a mold located in the hollow composite material structure, the mold being constituted by a plurality of segments and kept as a single structure by coupling adjacent side surfaces of the segments to each other. The method includes: laminating a prepreg on an outer peripheral surface of the mold, the prepreg being configured to become the skin by thermal curing; forming a vacuum bag after the prepreg is laminated, the vacuum bag being configured to seal an outside of the mold; and inserting seal members in seal grooves each provided on at least one of the adjacent side surfaces of the segments, each of the seal members being formed in a line shape having ends. A part of the seal member which part contacts a bottom surface of the seal groove when the seal member is inserted in the seal groove is referred to as a seal bottom portion. A part of the seal member which part is opposed to the seal bottom portion is referred to as a seal upper portion. A lip portion is provided at the seal upper portion such that at least a tip end of the lip portion projects to an outside of the seal groove when the seal member is inserted in the seal groove. The seal member is hollow therein or includes a concave portion on at least the seal bottom portion of the seal member. When assembling the segments as the single structure, the adjacent side surfaces of the segments are coupled to each other, and the seal member provided at one of the segments is crushed in a cross sectional direction by the side surface of the other segment to seal between the segments. The method further includes, while subjecting an inside of the vacuum bag to vacuum suction, subjecting the prepreg to the thermal curing while being pressurized by autoclaving of the entire mold.

According to the above configuration, the seal structure including the seal member configured as above is provided between the adjacent segments. The seal member includes the lip portion and the hollow or concave portion and is formed in a line configuration having ends. Therefore, regarding the cross sectional direction of the seal member, the sealed state can be formed by compressing the seal member without applying a high load. Regarding the longitudinal direction of the seal member, the expansion (linear expansion) in the longitudinal direction generated by the heating during the autoclaving can be easily adjusted by both end portions of the seal member.

With this, the more satisfactory and stable sealed state can be realized between the adjacent segments. Therefore, when the vacuum bag is formed on the outer peripheral surface of the mold, the inside of the vacuum bag can be satisfactorily subjected to the vacuum suction. Therefore, during the autoclaving, the prepreg located outside the mold and inside the vacuum bag can be satisfactorily pressurized.

In addition, since the increase in the moving load of the segment can be suppressed or avoided, the level difference between the adjacent segments can be satisfactorily adjusted when assembling the mold. With this, the accuracy of the outer peripheral surface of the mold improves, so that the high quality skin can be formed. As a result, the complication of the manufacturing steps can be suppressed or avoided while realizing the satisfactory sealed state between the adjacent segments of the mold.

In the method of manufacturing the composite material structure configured as above, the composite material structure may include a skeleton member in addition to the skin. The skeleton member may be attached to the outer peripheral surface of the mold, and the prepreg may be laminated on an outside of the skeleton member. A caul plate covering the prepreg may be attached to an outside of the prepreg.

In the method of manufacturing the composite material structure configured as above, a surface of the segment which surface constitutes an outer peripheral surface of the single structure may be referred to as a front surface of the segment. Both end portions of the seal groove may be bent toward the front surface of the segment. A length of the seal member may be set such that when the seal member is inserted in the seal groove, end portions of the seal member are exposed from respective end portions of the seal groove, i.e., from the front surface of the segment. After the seal member is inserted in the seal groove, the end portions of the seal member may be cut near the front surface of the segment. End portion pressing members may be then fixed to the segment and press the respective end portions of the seal member such that the end portions of the seal member are not exposed from the front surface of the segment.

In the method of manufacturing the composite material structure configured as above, after the end portions of the seal member are cut near the front surface of the segment, the end portions of the seal member may be covered with bonding members to be bonded to the front surface of the segment. The end portions of the seal members may be then pressed by the respective end portion pressing members.

In the method of manufacturing the composite material structure configured as above, the plurality of segments may be fixed to a pair of annular holding members to be kept as the single structure.

In the method of manufacturing the composite material structure configured as above, the plurality of segments may include: a segment having the side surface on which the seal groove is provided; and a segment having the side surface on which the seal groove is not provided.

In the method of manufacturing the composite material structure configured as above, a surface of the segment which surface constitutes an outer peripheral surface of the single structure may be referred to as a front surface of the segment. The segments may include two types of segments that are first segments each having such a shape that when the first segment is arranged horizontally with the front surface facing upward, each of both side surfaces of the first segment faces a horizontal direction or a direction inclined upward relative to the horizontal direction, and second segments each having such a shape that when the second segment is arranged horizontally with the front surface facing upward, each of both side surfaces of the second segment faces a direction inclined downward relative to the horizontal direction. The first segments and the second segments may be alternately arranged such that the second segments are first fixed at every other fixing positions of the annular holding members, each of the first segments is inserted between the second segments, and the side surfaces of the first and second segments are coupled to each other. The seal grooves may be provided only on the side surfaces of the first segments.

In the method of manufacturing the composite material structure configured as above, a plurality of concave portions into which skeleton materials are fitted may be formed on the front surfaces of the first and second segments. The skeleton materials may be first attached to the first and second segments, and the first and second segments may be then fixed to the annular holding members.

In the method of manufacturing the composite material structure configured as above, the lip portion may project in a normal direction of the seal upper portion or project so as to be inclined relative to the normal direction of the seal upper portion. One of a width of the seal upper portion and a width of the seal bottom portion in a cross section of the seal member may be larger than the other.

In the method of manufacturing the composite material structure configured as above, the concave portion may also be formed on the seal upper portion so as to be located close to the lip portion.

The present invention is not limited to the above embodiment, and various modifications may be made within the scope of the claims. An embodiment obtained by suitably combining technical means disclosed in different embodiments and a plurality of modified examples is also included in the technical scope of the present invention.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The present invention is widely used in the fields of manufacturing a large and substantially cylindrical composite material structure, such as a fuselage of an aircraft.

REFERENCE SIGNS LIST 10 mold for manufacturing composite material structure (mold)
11 mandrel (single structure)
12 support ring (annular holding member)
17A, 17B mandrel (single structure)
20 first segment (segment)
21 segment front surface
22 segment end portion surface
23 segment side surface
24 segment end surface
25 seal groove
25a outer seal groove (seal groove)
25b inner seal groove (seal groove)
26 seal member
26a first seal member (seal member)
26b second seal member (seal member)
27 seal end portion pressing member (end portion pressing member)
30 second segment (segment)
33 segment side surface
40 third segment
50 prepreg
51 caul plate
52 bagging film (vacuum bag)
53, 54 bonding member
261 seal main body
262 upright lip portion (lip portion)
263 hollow portion (inner hollow)
264 bottom surface concave portion (concave portion)
265 inclined lip portion (lip portion)
266 upper surface concave portion (concave portion)

The invention claimed is:

1. A method of manufacturing a hollow composite material structure including a skin constituted by at least a thermosetting resin composition and a fiber material,
the method using a mold located in the hollow composite material structure, the mold being constituted by a plurality of segments and kept as a single structure by coupling adjacent side surfaces of the segments to each other,
the method comprising:
laminating a prepreg on an outer peripheral surface of the mold, the prepreg being configured to become the skin by thermal curing;
forming a vacuum bag after the prepreg is laminated, the vacuum bag being configured to seal an outside of the mold; and
inserting seal members in seal grooves each provided on at least one of the adjacent side surfaces of the segments, each of the seal members being formed in a line shape having ends, wherein:
a part of the seal member which part contacts a bottom surface of the seal groove when the seal member is inserted in the seal groove is referred to as a seal bottom portion;
a part of the seal member which part is opposed to the seal bottom portion is referred to as a seal upper portion;

a lip portion is provided at the seal upper portion such that at least a tip end of the lip portion projects to an outside of the seal groove when the seal member is inserted in the seal groove;

the seal member is hollow therein or includes a concave portion on at least the seal bottom portion of the seal member; and when assembling the segments as the single structure, the adjacent side surfaces of the segments are coupled to each other, and the seal member provided at one of the segments is crushed in a cross sectional direction by the side surface of the other segment to seal between the segments, the method further comprising while subjecting an inside of the vacuum bag to vacuum suction, subjecting the prepreg to the thermal curing while being pressurized by autoclaving of the entire mold, wherein:

a surface of the segment which surface constitutes an outer peripheral surface of the single structure is referred to as a front surface of the segment;

both end portions of the seal groove are bent toward the front surface of the segment;

a length of the seal member is set such that when the seal member is inserted in the seal groove, end portions of the seal member are exposed from respective end portions of the seal groove, i.e., from the front surface of the segment;

after the seal member is inserted in the seal groove, the end portions of the seal member are cut near the front surface of the segment; and end portion pressing members are then fixed to the segment and press the respective end portions of the seal member such that the end portions of the seal member are not exposed from the front surface of the segment.

2. The method according to claim 1, wherein:

the composite material structure includes a skeleton member in addition to the skin;

the skeleton member is attached to the outer peripheral surface of the mold, and the prepreg is laminated on an outside of the skeleton member; and a caul plate covering the prepreg is attached to an outside of the prepreg.

3. The method according to claim 1, wherein:

after the end portions of the seal member are cut near the front surface of the segment, the end portions of the seal member are covered with bonding members to be bonded to the front surface of the segment; and the end portions of the seal members are then pressed by the respective end portion pressing members.

4. The method according to claim 1, wherein the plurality of segments are fixed to a pair of annular holding members to be kept as the single structure.

5. The method according to claim 4, wherein the plurality of segments include:

a segment having the side surface on which the seal groove is provided; and a segment having the side surface on which the seal groove is not provided.

6. The method according to claim 5, wherein:

the segments includes two types of segments that are first segments each having such a shape that when the first segment is arranged horizontally with the front surface facing upward, each of both side surfaces of the first segment faces a horizontal direction or a direction inclined upward relative to the horizontal direction, and second segments each having such a shape that when the second segment is arranged horizontally with the front surface facing upward, each of both side surfaces of the second segment faces a direction inclined downward relative to the horizontal direction;

the first segments and the second segments are alternately arranged such that the second segments are first fixed at every other fixing positions of the annular holding members, each of the first segments is inserted between the second segments, and the side surfaces of the first and second segments are coupled to each other; and the seal grooves are provided only on the side surfaces of the first segments.

7. The method according to claim 6, wherein:

a plurality of concave portions into which skeleton materials are fitted are formed on the front surfaces of the first and second segments; and the skeleton materials are first attached to the first and second segments, and the first and second segments are then fixed to the annular holding members.

8. The method according to claim 1, wherein:

the lip portion projects in a normal direction of the seal upper portion or projects so as to be inclined relative to the normal direction of the seal upper portion; and one of a width of the seal upper portion and a width of the seal bottom portion in a cross section of the seal member is larger than the other.

9. The method according to claim 1, wherein the concave portion is also formed on the seal upper portion so as to be located close to the lip portion.

* * * * *